US012647715B2

(12) United States Patent
Wang et al.

(10) Patent No.: US 12,647,715 B2
(45) Date of Patent: Jun. 2, 2026

(54) SPEAKER MODULE AND EARPHONE

(71) Applicant: Beijing Honor Device Co., Ltd., Beijing (CN)

(72) Inventors: Chuanguo Wang, Beijing (CN); Yunhai Li, Beijing (CN); Dong Wu, Beijing (CN); Chienfeng Yeh, Beijing (CN); Yuanwu Jiang, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 268 days.

(21) Appl. No.: 18/272,495

(22) PCT Filed: Aug. 24, 2022

(86) PCT No.: PCT/CN2022/114634

§ 371 (c)(1),
(2) Date: Jul. 14, 2023

(87) PCT Pub. No.: WO2023/071473

PCT Pub. Date: May 4, 2023

(65) Prior Publication Data

US 2024/0089650 A1 Mar. 14, 2024

(30) Foreign Application Priority Data

Oct. 29, 2021 (CN) ......................... 202111276330.X

(51) Int. Cl.

*H04R 1/10* (2026.01)
*H04R 9/06* (2006.01)
*H04R 17/00* (2006.01)

(52) U.S. Cl.

CPC ......... *H04R 1/1075* (2013.01); *H04R 1/1016* (2013.01); *H04R 1/1041* (2013.01); *H04R 9/06* (2013.01); *H04R 17/00* (2013.01); *H04R 2400/11* (2013.01)

(58) Field of Classification Search

None
See application file for complete search history.

(56) References Cited

U.S. PATENT DOCUMENTS

| | | | |
|---|---|---|---|
| 4,672,675 | A | 6/1987 | Powell et al. |
| 6,567,529 | B1 | 5/2003 | Roark |
| 2016/0119719 | A1 | 4/2016 | Doshida et al. |

(Continued)

FOREIGN PATENT DOCUMENTS

| | | | |
|---|---|---|---|
| CN | 204498328 | U | 7/2015 |
| CN | 205726289 | U | 11/2016 |

(Continued)

*Primary Examiner* — Walter F Briney, III

(74) *Attorney, Agent, or Firm* — WOMBLE BOND DICKINSON (US) LLP

(57) ABSTRACT

Disclosed are a speaker module and an earphone. The speaker module includes a first speaker unit, a bracket, and a second speaker unit. The first speaker unit includes a basin frame and a wiring terminal. The wiring terminal is disposed on the basin frame. The bracket includes an electrically conductive portion. The second speaker unit is fastened to the basin frame by using the bracket. An electrode of the second speaker unit is electrically connected to the wiring terminal by using the electrically conductive portion.

16 Claims, 16 Drawing Sheets

(56) References Cited

U.S. PATENT DOCUMENTS

| | | | | |
|---|---|---|---|---|
| 2016/0183006 | A1* | 6/2016 | Tokuhisa | H04R 1/06 381/190 |
| 2017/0155993 | A1 | 6/2017 | Boesen | |
| 2017/0164082 | A1 | 6/2017 | Lee | |
| 2018/0098147 | A1* | 4/2018 | Hosaka | H04R 17/00 |
| 2021/0092503 | A1* | 3/2021 | Liu | H04R 25/656 |

FOREIGN PATENT DOCUMENTS

| | | | | | |
|---|---|---|---|---|---|
| CN | 205793159 | U | | 12/2016 | |
| CN | 205864673 | U | | 1/2017 | |
| CN | 107889553 | A | | 4/2018 | |
| CN | 207354585 | U | | 5/2018 | |
| CN | 208227320 | U | | 12/2018 | |
| CN | 208798211 | U | | 4/2019 | |
| CN | 209283447 | U | | 8/2019 | |
| CN | 212278462 | U | | 1/2021 | |
| JP | 2003299190 | A | | 10/2003 | |
| JP | 2016042685 | A | | 3/2016 | |
| KR | 20040057071 | A | | 7/2004 | |
| KR | 101309072 | B1 | * | 10/2013 | H04R 5/033 |
| KR | 20160048304 | A | * | 5/2016 | H04R 17/00 |
| WO | 2020158173 | A1 | | 8/2020 | |

* cited by examiner

SPEAKER MODULE AND EARPHONE

CROSS-REFERENCE TO RELATED APPLICATIONS

This application is a national stage of International Application No. PCT/CN2022/114634 filed on Aug. 24, 2022, which claims priority to Chinese Patent Application No. 202111276330.X filed on Oct. 29, 2021. The disclosures of both of the aforementioned application are hereby incorporated by reference in their entireties.

TECHNICAL FIELD

This application relates to the technical field of electronic products, and in particular, to a speaker module and an earphone.

BACKGROUND

During use of an electronic product, an earphone has become an essential accessory for the electronic product, to enable a user to listen to sound information provided by the electronic product without disturbing others.

In the related art, a speaker module in an earphone has poor structural compactness and low assembly efficiency.

SUMMARY

This application provides a speaker module and an earphone that have good structural compactness.

To achieve the foregoing objective, the following technical solutions are used in embodiments of this application.

According to a first aspect, this application provides a speaker module, including: a first speaker unit, a bracket, and a second speaker unit. The first speaker unit includes a basin frame and a wiring terminal. The wiring terminal is disposed on the basin frame. The bracket includes an electrically conductive portion. The second speaker unit is fastened to the basin frame by using the bracket. An electrode of the second speaker unit is electrically connected to the wiring terminal by using the electrically conductive portion.

In the speaker module according to the embodiment in the first aspect of this application, the bracket is provided, and the basin frame of the first speaker unit and the second speaker unit are fastened by using the bracket, so that the first speaker unit and the second speaker unit are connected together to facilitate modularization of the speaker module. In this way, during mounting of the speaker module, the first speaker unit and the second speaker unit can be used as a whole for mounting, so that the first speaker unit and the second speaker unit do not need to be separately mounted into a housing of an earphone. This can simplify mounting of the speaker module, and implement structural compactness of the speaker module. In addition, the bracket is provided with the electrically conductive portion, and the electrode of the second speaker unit is electrically connected to the wiring terminal by using the electrically conductive portion, so that an electrical connection relationship between the first speaker unit and the second speaker unit can be simplified at least to some extent, and at least one signal line used to electrically connect the first speaker unit and the second speaker unit can be eliminated. Therefore, a structure of the entire speaker module is simplified, and it is convenient to connect the speaker module to a circuit board by using the wiring terminal.

In a possible implementation of the first aspect of this application, the wiring terminal includes a negative wiring terminal; a negative electrode of the second speaker unit is electrically connected to the negative wiring terminal by using the electrically conductive portion; and the electrically conductive portion may be electrically connected to a ground point on the circuit board. These settings can eliminate a negative signal line connected between the negative wiring terminal and the negative electrode of the second speaker unit, so that the structure of the speaker module is simplified. In addition, when the electrically conductive portion is grounded, use stability of the bracket can also be improved to avoid a short circuit problem at least to some extent.

In a possible implementation of the first aspect of this application, the first speaker unit includes a first diaphragm assembly; the first diaphragm assembly is supported by the basin frame; the bracket includes a support plate and a connecting portion; the support plate is disposed on an axial side of the first speaker unit and is opposite an outer surface of the first diaphragm assembly; the connecting portion is connected between an outer peripheral edge of the support plate and a peripheral wall of the basin frame; and the second speaker unit is supported by a side, away from the first speaker unit, of the support plate. These settings facilitate supporting the second speaker unit by using the support plate. In another implementation, the bracket may not include the support plate.

In a possible implementation of the first aspect of this application, the electrically conductive portion may consist of only a part of the connecting portion.

In a possible implementation of the first aspect of this application, the electrically conductive portion may consist of only the connecting portion.

In a possible implementation of the first aspect of this application, the electrically conductive portion may consist of a part of the connecting portion and a part of the support plate.

In a possible implementation of the first aspect of this application, the electrically conductive portion may consist of a part of the connecting portion and the entire support plate.

In a possible implementation of the first aspect of this application, the electrically conductive portion may consist of the bracket. This can simplify a structure of the bracket, facilitate processing and manufacturing of the bracket, and reduce processing costs.

In a possible implementation of the first aspect of this application, a first voice transmission channel is formed in the support plate; and the second speaker unit does not cover the first voice transmission channel. These settings can prevent the support plate and the second speaker unit from blocking transmission of sound produced by vibration of the first diaphragm assembly, thereby avoiding impact on a sound production effect of the first speaker unit.

In a possible implementation of the first aspect of this application, there are a plurality of spaced first voice transmission channels.

In a possible implementation of the first aspect of this application, the support plate takes the shape of a ring to define a first voice transmission channel; the second speaker unit takes the shape of a ring extending in a circumferential direction of the support plate to define an avoidance channel; and the avoidance channel is communicated with the first voice transmission channel.

In a possible implementation of the first aspect of this application, the connecting portion includes at least two sub-portions; the at least two sub-portions are spaced apart in a circumferential direction of the basin frame; each sub-portion is connected between the outer peripheral edge of the support plate and an outer peripheral surface of the basin frame; a clamping hole is formed in each sub-portion; and a clamping rib fitting the clamping hole is formed on the outer peripheral surface of the basin frame. Therefore, detachable connection between the bracket and the basin frame is implemented. Alternatively, in another implementation, clamping ribs are formed on the sub-portions, and a clamping hole is formed in the basin frame.

In a possible implementation of the first aspect of this application, clamping holes are formed in some of the at least two sub-portions.

In a possible implementation of the first aspect of this application, a sound transmission channel may be formed between two adjacent sub-portions. Sound produced by vibration of the first diaphragm assembly is transmitted by using the sound transmission channel, so that a sound production effect of the first speaker unit is improved.

In a possible implementation of the first aspect of this application, in a plane parallel to the first diaphragm assembly, a part of an orthographic projection of the sound transmission channel is within an outer contour of an orthographic projection of the first diaphragm assembly. The setting can further improve a transmission effect of the sound transmission channel for sound produced by the first speaker unit.

In a possible implementation of the first aspect of this application, a second voice transmission channel is formed in a part, between the first diaphragm assembly and the support plate, of each sub-portion. The setting can further improve a transmission effect for sound produced by the first speaker unit.

In a possible implementation of the first aspect of this application, a second voice transmission channel is formed in a part, between the first diaphragm assembly and the support plate, of each of some of the at least two sub-portions.

In a possible implementation of the first aspect of this application, the connecting portion takes the shape of a closed ring extending in a circumferential direction of the basin frame; a clamping hole is formed in the connecting portion; and a clamping rib fitting the clamping hole is formed on an outer peripheral surface of the basin frame. Therefore, detachable connection between the bracket and the basin frame is implemented. Alternatively, in another implementation, a clamping rib is formed on the connecting portion, and a clamping hole is formed in the basin frame.

In a possible implementation of the first aspect of this application, a plurality of clamping holes are formed in the connecting portion; and the plurality of clamping holes are spaced apart in a circumferential direction of the basin frame. This helps improve reliability of fitting between the connecting portion and the basin frame.

In a possible implementation of the first aspect of this application, a second voice transmission channel is formed in a part, between the first diaphragm assembly and the support plate, of the connecting portion. The setting can prevent, to some extent, the sub-portions from blocking the first speaker unit, so that impact on sound transmission of the first speaker unit is avoided.

In a possible implementation of the first aspect of this application, a plurality of second voice transmission channels are formed in a part, between the first diaphragm assembly and the support plate, of the connecting portion; and the plurality of second voice transmission channels are spaced apart in a circumferential direction of the basin frame. The setting can prevent, to some extent, the sub-portions from blocking the first speaker unit, so that impact on sound transmission of the first speaker unit is avoided.

In a possible implementation of the first aspect of this application, in the plane parallel to the first diaphragm assembly, an orthographic projection of the second voice transmission channel is within the outer contour of the orthographic projection of the first diaphragm assembly. The setting can further improve a transmission effect of the second voice transmission channel for sound of the first speaker unit.

In a possible implementation of the first aspect of this application, the first speaker unit includes a first voice coil; the first voice coil is connected to an inner surface of the first diaphragm assembly; the negative wiring terminal is provided with an electrically conductive extending portion that is disposed in the basin frame; and the electrically conductive extending portion may be electrically connected to a negative lead of the first voice coil. Because the negative lead of the first voice coil is thin, structural strength of the negative lead is weak, and the negative lead is easy to damage due to scratching. Therefore, the electrically conductive extending portion is electrically connected to the negative lead of the first voice coil, so that a length of the negative lead can be shortened. This avoids a problem that the negative lead is damaged due to scratching with the basin frame, and helps improve working reliability of the first voice coil.

In a possible implementation of the first aspect of this application, a peripheral wall of the basin frame is provided with a first opening; the negative wiring terminal is provided with an electrically conductive extending portion that is disposed in the basin frame; the electrically conductive extending portion extends into the first opening; and a part, directly opposite the first opening, of the electrically conductive portion is connected to the electrically conductive extending portion. Therefore, the second speaker unit can be electrically connected to the negative wiring terminal by using the bracket. Moreover, compared with a solution in which an electrically conductive portion is electrically connected to a negative wiring terminal outside a basin frame directly, the negative wiring terminal does not need to be extended out of the basin frame by an excessive length, thereby avoiding interference that is with a structure in the housing and that is caused when the negative wiring terminal is extended out of the basin frame by the excessive length.

In a possible implementation of the first aspect of this application, the speaker module includes an electrically conductive member; the wiring terminal includes a positive wiring terminal; and a positive electrode of the second speaker unit is electrically connected to the positive wiring terminal by using the electrically conductive member.

In a possible implementation of the first aspect of this application, the electrically conductive member may be an enameled wire. In this way, the electrically conductive member can be insulated from the bracket.

In a possible implementation of the first aspect of this application, the first speaker unit includes a first voice coil; the first voice coil is connected to an inner surface of the first diaphragm assembly; the positive wiring terminal is provided with an electrically conductive wiring portion that is disposed in the basin frame; and the electrically conductive wiring portion may be electrically connected to a positive lead of the first voice coil. Because the positive lead of the first voice coil is thin, structural strength of the positive lead is weak, and the positive lead is easy to damage due to scratching. For this reason, the electrically conductive wiring portion is electrically connected to the positive lead of the first voice coil, so that a length of the positive lead can be shortened. This avoids a problem that the positive lead is damaged due to scratching with the basin frame, and helps improve working reliability of the first voice coil.

In a possible implementation of the first aspect of this application, the positive wiring terminal is provided with an electrically conductive wiring portion that is disposed in the basin frame; the peripheral wall of the basin frame is provided with a second opening; and the electrically conductive member extends into the basin frame through the second opening and is electrically connected to the electrically conductive wiring portion. Therefore, the second speaker unit can be electrically connected to the positive wiring terminal by using the electrically conductive member. Moreover, compared with a solution in which an electrically conductive member is electrically connected to a positive wiring terminal outside a basin frame directly, the positive wiring terminal does not need to be extended out of the basin frame by an excessive length, thereby avoiding interference that is with a structure in the housing and that is caused when the positive wiring terminal is extended out of the basin frame by the excessive length.

In a possible implementation of the first aspect of this application, a part of the electrically conductive member is disposed on a side to which an outer surface of the connecting portion faces; a cabling channel is formed in the outer surface of the connecting portion; and a part of the electrically conductive member is disposed in the cabling channel. These settings can avoid the following problem: The electrically conductive member protrudes from the outer surface of the connecting portion and interferes with another structure in the housing.

In a possible implementation of the first aspect of this application, the second speaker unit is a piezoelectric ceramic speaker unit; and the piezoelectric ceramic speaker unit and the support plate are disposed via laminating. The setting makes a structure more compact.

In a possible implementation of the first aspect of this application, the negative electrode of the second speaker unit is disposed at an end, close to the support plate, of the second speaker unit; and the negative electrode of the second speaker unit and the support plate are connected to each other by using an electrically conductive adhesive. These settings can facilitate electrically connecting the negative electrode of the second speaker unit to the support plate, so that a structure, such as a signal line, used for electrical connection does not need to be additionally disposed therebetween. This can simplify a structure of the speaker module, reduce costs of the speaker module, and facilitate assembly.

In a possible implementation of the first aspect of this application, the positive electrode of the second speaker unit is disposed at an end, away from the support plate, of the second speaker unit; and the positive electrode of the second speaker unit and the electrically conductive member are connected to each other by using an electrically conductive adhesive or via welding. These settings can facilitate spacing the positive electrode and the negative electrode of the second speaker unit apart, so that a short circuit problem can be avoided at least to some extent.

In a possible implementation of the first aspect of this application, the piezoelectric ceramic speaker unit includes a piezoelectric ceramic sheet. The piezoelectric ceramic sheet includes a piezoelectric body, a first electrode layer, and a second electrode layer. The first electrode layer is disposed on a surface on a side, facing the support plate, of the piezoelectric body to form the negative electrode of the piezoelectric ceramic speaker unit. The first electrode layer and the support plate may be electrically connected to each other by using an electrically conductive adhesive. The second electrode layer is disposed on a surface on a side, away from the support plate, of the piezoelectric body to form the positive electrode of the piezoelectric ceramic speaker unit. The second electrode layer may be electrically connected to the electrically conductive member.

In a possible implementation of the first aspect of this application, the second speaker unit is a moving-iron speaker unit; and the moving-iron speaker unit is vertically supported by the support plate. These settings make a structure more compact.

In a possible implementation of the first aspect of this application, the moving-iron speaker unit includes a second diaphragm assembly; and the second diaphragm assembly is disposed perpendicular to the first diaphragm assembly. Therefore, sound output by the first speaker unit can be prevented at least to some extent from interfering vibration of the second diaphragm assembly.

In a possible implementation of the first aspect of this application, the second speaker unit further includes a protecting shell, a reed, a transmission rod, a second magnetic circuit system, and a second voice coil. The second diaphragm assembly is disposed in the protecting shell to divide space in the protecting shell into a front cavity and a rear cavity. All of the reed, the transmission rod, the second magnetic circuit system, and the second voice coil are disposed in the rear cavity. The reed, the transmission rod, the second magnetic circuit system, and the second voice coil cooperate to drive the second diaphragm assembly to vibrate.

In a possible implementation of the first aspect of this application, the second diaphragm assembly is parallel to an axial direction of the first speaker unit, to divide space in the protecting shell into a front cavity and a rear cavity. The second magnetic circuit system and the second voice coil are disposed coaxially. Therefore, a structure is simple, and a size is small.

In a possible implementation of the first aspect of this application, the reed includes a first reed body, a second reed body, and a connecting reed body. Both the first reed body and the second reed body are disposed parallel to the second diaphragm assembly. The second reed body is disposed on a side, away from the second diaphragm assembly, of the first reed body. An end of the second reed body is provided with a support body that exceeds an edge of the first reed body. The connecting reed body is connected between an end, away from the support body, of the second reed body and an end, away from the support body, of the first reed body. The support body is connected to an end of the transmission rod. The other end of the transmission rod is connected to the second diaphragm assembly.

In a possible implementation of the first aspect of this application, the second magnetic circuit system includes a magnetically conductive portion and two magnet portions. The magnetically conductive portion takes the shape of a ring. An axial direction of the magnetically conductive portion is the same as an axial direction of the first speaker unit. The first reed body is supported by a surface on a side, close to the second diaphragm assembly, of the magnetically conductive portion. The two magnet portions are disposed in the magnetically conductive portion and are opposite in a radial direction of the magnetically conductive portion. The second reed body penetrates from one end in the axial direction of the magnetically conductive portion to the other end in the axial direction of the magnetically conductive portion, so that the support body is disposed on an outer side of the magnetically conductive portion, and the second reed body is disposed between the two magnet portions.

In a possible implementation of the first aspect of this application, a side wall, close to the support plate, of the protecting shell may constitute an electrically conductive structure; the electrically conductive structure can form the negative electrode of the second speaker unit; the electrically conductive structure is electrically connected to the support plate by using the electrically conductive adhesive; and a negative lead of the second voice coil is welded to the electrically conductive structure. Based on these settings, the negative electrode of the second speaker unit can be electrically connected to the negative wiring terminal by using the bracket.

In a possible implementation of the first aspect of this application, a peripheral wall of the protecting shell is provided with a through hole; and a negative lead of the second voice coil can penetrate the through hole to be electrically connected to the bracket.

In a possible implementation of the first aspect of this application, a wire passing hole is formed in a peripheral wall of the protecting shell; and the electrically conductive member may penetrate the wire passing hole to be electrically connected to a positive lead of the second voice coil; or the positive lead of the second voice coil penetrates the wire passing hole to be electrically connected to the electrically conductive member.

In a possible implementation of the first aspect of this application, a sound production frequency of the second speaker unit is greater than a sound production frequency of the first speaker unit. In this way, the earphone includes the first speaker unit and the second speaker unit that have different sound production frequencies, so that a difference between the sound production frequencies of the first speaker unit and the second speaker unit can be used to enable the earphone to have a relatively good sound expression in sound ranges of different frequencies, thereby improving a sound output effect of the speaker module.

According to a second aspect, this application provides an earphone, including: a housing, a circuit board, and the speaker module in any one of the foregoing technical solutions. A sound output hole is formed in the housing. The circuit board is disposed in the housing. The speaker module is disposed in the housing. Both the first speaker unit and the second speaker unit produce sound towards the sound output hole. The speaker module is electrically connected to the circuit board by using a wiring terminal.

In the earphone according to the embodiment in the second aspect of this application, the speaker module including the bracket is provided, and the basin frame of the first speaker unit and the second speaker unit are fastened by using the bracket, so that the first speaker unit and the second speaker unit are connected together to facilitate modularization of the speaker module. In this way, during mounting of the speaker module, the first speaker unit and the second speaker unit can be used as a whole for mounting, so that the first speaker unit and the second speaker unit do not need to be separately mounted into the housing of the earphone. This can simplify mounting of the speaker module, and implement structural compactness of the speaker module. In addition, the bracket is provided with the electrically conductive portion, and the electrode of the second speaker unit is electrically connected to the wiring terminal by using the electrically conductive portion, so that an electrical connection relationship between the first speaker unit and the second speaker unit can be simplified at least to some extent, and at least one signal line used to electrically connect the first speaker unit and the second speaker unit can be eliminated. Therefore, a structure of the entire speaker module is simplified, and it is convenient to connect the speaker module to a circuit board by using the wiring terminal.

REFERENCE NUMERALS

Figure 1:
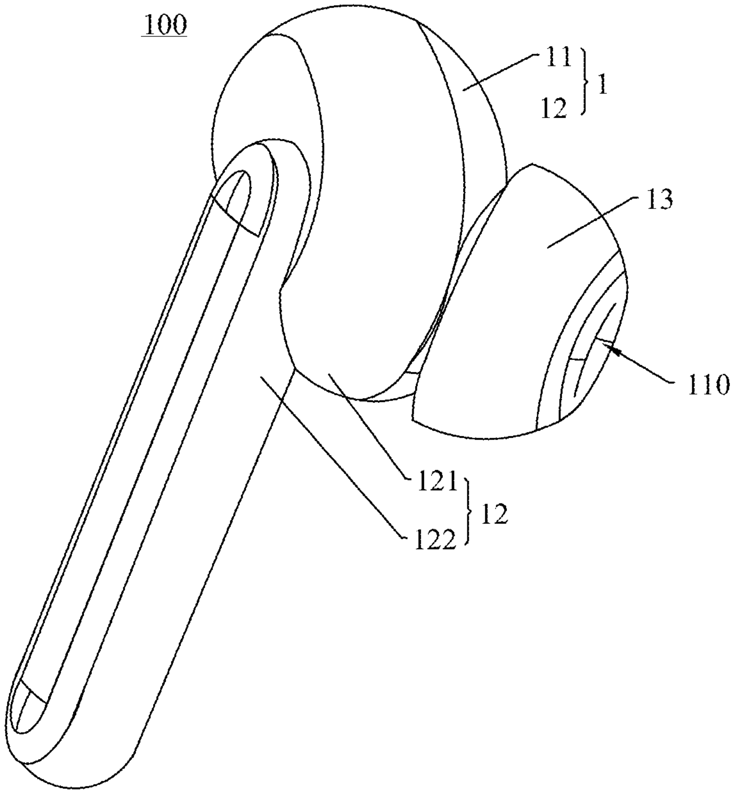
FIG. 1 is a schematic diagram of a structure of an earphone according to some embodiments of this application.

100: earphone;

1: housing; 10: accommodating space; 101: first accommodating cavity; 11: front housing; 110: sound output hole; 111: main body portion; 112: extending portion; 1121: limiting convex rib; 12: rear housing; 102: second accommodating cavity; 121: cover body; 122: rod body; 13: contact sleeve;

2: main board;

3: battery;

4: speaker module;

**4*a*: first speaker unit; 4*a*21: first diaphragm assembly; 4*a*211: first connecting portion; 4*a*212: first corrugated rim; 4*a*213: first dome; 4*a*22: first voice coil; 4*a*23: first magnetic circuit system; 4*a*23*a*: magnetic gap; 4*a*231: edge magnetic portion; 4*a*232: first central magnetic portion; 4*a*233: second central magnetic portion; 4*a*234: magnetically conductive yoke; 4*a*24: basin frame; 4*a*241: first opening; 4*a*242: second opening; 4*a*2413: circular groove; 4*a*25: wiring terminal; 4*a*251: negative wiring terminal; 4*a*2511: electrically conductive extending portion; 4*a*252: positive wiring terminal; 4*a*2521**: electrically conductive wiring portion;

**4*b*: second speaker unit; 4*b*1: protecting shell; 4*b*1*a*: first shell portion; 4*b*1*b*: second shell portion; 4*b*11: sound output channel; 4*b*21: second diaphragm assembly; 4*b*21*a*: second connecting portion; 4*b*21*b*: second corrugated rim; 4*b*21*c*: second dome; 4*b*22: reed; 4*b*221: first reed body; 4*b*222: second reed body; 4*b*223: connecting reed body; 4*b*224: support body; 4*b*23: transmission rod; 4*b*24: second magnetic circuit system; 4*b*241: magnetically conductive portion; 4*b*242: magnet portion; 4*b*25: second voice coil; 4*b*3: avoidance channel; 4*b*41: first electrode layer; 4*b*42: second electrode layer; 4*b*43**: piezoelectric body;

**4*c*: bracket; 4*c*1: support plate; 4*c*11: first voice transmission channel; 4*c*2: connecting portion; 4*c*21: sub-portion; 4*c*211: clamping hole; 4*c*22: cabling channel; 4*c*23: sound transmission channel; 4*c*24**: second voice transmission channel;

**4*d***: electrically conductive member;

**4*e***: electrically conductive adhesive;

5: wireless charging module; 51: power receiving coil; 52: AC-DC converting component; 53: charging control component; 6: wireless communication module;

200: wireless charging dock; 201: charging coil; 202: DC-AC converting component; 203: power interface.

DESCRIPTION OF EMBODIMENTS

In embodiments of this application, the term such as "first" or "second" is used only for describing purposes, and cannot be understood as an indication or implication of relative importance or an implication of a quantity of indicated technical features. Therefore, a feature defined by "first" or "second" may explicitly or implicitly include one or more features.

In the descriptions of the embodiments of this application, it should be noted that unless otherwise specified and defined explicitly, the terms "mount", "connect", and "connection" should be understood in a general sense. For example, "connection" may be detachable connection or non-detachable connection; or may be direct connection or indirect connection through an intermediate medium. Orientation terms such as "inside" and "outside" mentioned in the embodiments of this application merely refer to directions in the accompanying drawings. Therefore, the used orientation terms are intended for better and clearer description and understanding of the embodiments of this application, and are not intended for indicating or implying that an indicated apparatus or element needs to have a specific orientation or be constructed and operated in a specific orientation, and therefore shall not be construed as limitations on the embodiments of this application. "A plurality of" means two or more.

In the embodiments of this application, terms "comprise", "include", or any other variations thereof are intended to cover non-exclusive inclusions, so that a process, method, article, or apparatus including a series of elements includes not only those elements, but also other elements not explicitly listed, or elements inherent to the process, method, article, or apparatus. In absence of more constraints, an element defined by "includes a . . . " does not preclude the existence of another identical element in a process, method, article, or apparatus that includes the element. In absence of more constraints, an element defined by "includes a . . . " does not preclude the existence of another identical element in a process, method, article, or apparatus that includes the element.

This application provides an earphone 100. The earphone 100 can be used in cooperation with an electronic product such as a mobile phone, a tablet computer, or a notebook computer, to receive sound information provided by the electronic product and output the sound information to a user. The earphone 100 is used in cooperation with the electronic product, to prevent external sound playing of the electronic product from interfering with other people. The earphone 100 may be a wireless earphone or may be a wired earphone.

Figure 2:
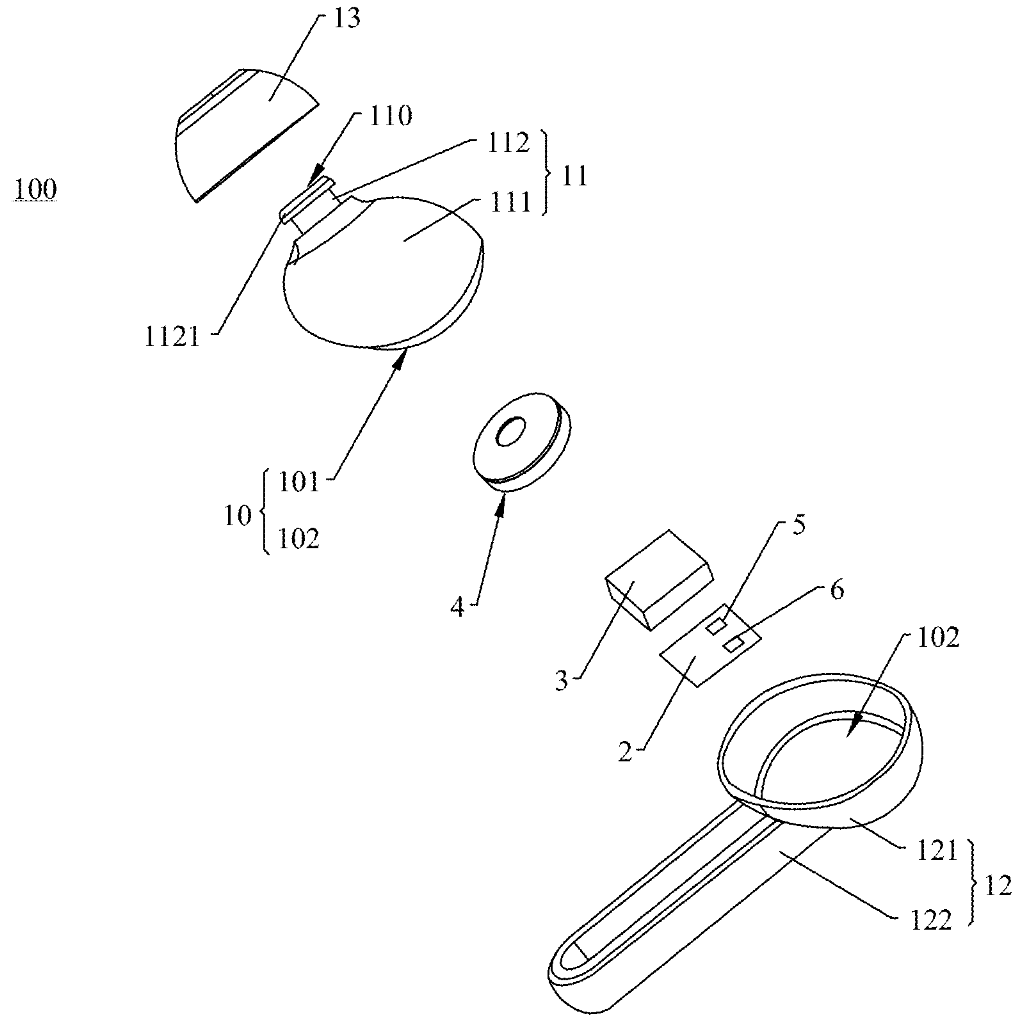
FIG. 2 is a schematic diagram of a decomposed structure of the earphone shown in FIG. 1.

Refer to FIG. 1 and FIG. 2. FIG. 1 is a schematic diagram of a structure of an earphone 100 according to some embodiments of this application. FIG. 2 is a schematic diagram of a decomposed structure of the earphone 100 shown in FIG. 1. The earphone 100 shown in FIG. 1 and FIG. 2 is described by using a wireless earphone as an example. In this embodiment, the earphone 100 may include a housing 1, a circuit board 2, a battery 3, a wireless charging module 5, a wireless communication module 6, and a speaker module 4.

It can be understood that FIG. 1, FIG. 2, and the following related accompanying drawings merely show examples of some components included in the earphone 100. Actual shapes, actual sizes, actual locations, and actual structures of these components are not limited by FIG. 1, FIG. 2, and the following accompanying drawings. In addition, when the earphone 100 is a wired earphone, the wired earphone may not include the battery 3, the wireless communication module 6, and the wireless charging module 5.

The housing 1 may be used as a carrier of a functional component in the earphone 100 to protect the functional component in an accommodating space 10 of the housing 1. In addition, when a user wears the earphone 100, the earphone 100 is in contact with the user's ear via the housing 1. Therefore, appearance of the housing 1 may match a shape of a human ear, to improve comfort of the user in wearing the earphone 100.

The housing 1 is directly exposed to an external environment to be in contact with a human ear; or the earphone 100 is in contact with other external structures via the housing 1. Therefore, an outer surface of the housing 1 is inevitably scratched, corroded, and so on. To avoid this technical problem, the housing 1 may have specific properties such as abrasion resistance, corrosion resistance, and scratch resistance, or a functional material used for abrasion resistance, corrosion resistance, and scratch resistance may be coated on the outer surface of the housing 1.

In some embodiments, the housing 1 may be used as an integral structure, that is, the housing 1 may be an integrally formed member, and the integrally formed housing 1 has higher structural strength. In some other embodiments, the housing 1 may be formed by assembling a plurality of portions. Still refer to FIG. 1 and FIG. 2. In this embodiment, the housing 1 may include a front housing 11 and a rear housing 12. The front housing 11 faces a human ear during use of the earphone 100; and the rear housing 12 is away from the human ear during use of the earphone 100. The housing 1 is formed by assembling the front housing 11 and the rear housing 12. This can facilitate separate processing of the front housing 11 and the rear housing 12, which helps simplify mold structures of the front housing 11 and the rear housing 12, thereby reducing difficulty of molding the front housing 11 and the rear housing 12, and further reducing difficulty in processing and manufacturing the housing 1. Specifically, the front housing 11 may be fixedly connected to the rear housing 12 via buckling; or the front housing 11 may be connected to the rear housing 12 by using a screw. Alternatively, in another implementation, the front housing 11 is fixedly connected to the rear housing 12 by using glue or an adhesive tape.

A material of the front housing 11 includes but is not limited to hard plastic, metal, and a combination of plastic and metal. The material of the front housing 11 may be hard plastic, to achieve a lightweight of the earphone 100.

Refer to FIG. 2. A first accommodating cavity 101 is formed in the front housing 11; and a side, close to the rear housing 12, of the first accommodating cavity 101 is open. A sound output hole 110 communicated with the first accommodating cavity 101 is formed in the front housing 11. Sound of the earphone 100 may be transmitted out of the earphone 100 through the sound output hole 110.

Specifically, the front housing 11 may include a main body portion 111 and an extending portion 112. The extending portion 112 may be disposed on a side of the main body portion 111 and extend in a direction away from the main body portion 111. Refer to FIG. 2. The first accommodating cavity 101 may be formed in the main body portion 111; and the sound output hole 110 may be formed in the extending portion 112. It can be understood that in some other embodiments, alternatively, the front housing 11 does not include the extending portion 112; and the sound output hole 110 is directly formed in a wall surface of the main body portion 111.

The earphone 100 may be further provided with a contact sleeve 13, to improve comfort of the user in wearing the earphone 100. The contact sleeve 13 may be configured to get in contact with the user's ear. For example, the contact sleeve 13 may be disposed around an outer peripheral surface of the extending portion 112; and appearance of the contact sleeve 13 may be similar to a shape of an auditory meatus of a human body, to improve suitability in wearing the earphone 100. In addition, the contact sleeve 13 may be made of a flexible material such as silica gel or rubber, to improve comfort of the user in wearing the earphone 100.

Refer to FIG. 2. A limiting convex rib 1121 may be formed on the outer peripheral surface of the extending portion 112, so that when the contact sleeve 13 is disposed around the outer peripheral surface of the extending portion 112, the limiting convex rib 1121 can abut against the contact sleeve 13 to limit the contact sleeve 13, thereby reducing a probability that the contact sleeve 13 naturally falls off the extending portion 112. Certainly, the earphone 100 may not include the contact sleeve 13, to reduce costs.

A material of the rear housing 12 may be the same as the material of the front housing 11. Certainly, the material of the rear housing 12 may be different from the material of the front housing 11. The material of the rear housing 12 may be hard plastic, to achieve a lightweight of the earphone 100.

Still refer to FIG. 2. The rear housing 12 may include a cover body 121 and a rod body 122. The cover body 121 may be connected to the front housing 11. The rod body 122 may be disposed on a side, away from the front housing 11, of the cover body 121. A second accommodating cavity 102 may be formed in the cover body 121. A side, close to the front housing 11, of the second accommodating cavity 102 is open, so that the second accommodating cavity 102 can be communicated with the first accommodating cavity 101. The second accommodating cavity 102 and the first accommodating cavity 101 may jointly constitute the accommodating space 10 of the housing 1.

The cover body 121 and the rod body 122 may be of a one-piece structure, that is, the cover body 121 and the rod body 122 are of an integral structure. This can simplify a technique of processing and manufacturing the rear housing 12 and improve strength of connection between the cover body 121 and the rod body 122. Certainly, this application is not limited thereto. The cover body 121 and the rod body 122 may be formed via assembly. The cover body 121 and the rod body 122 may be connected via adhering, clamping, screw connection, welding, or the like.

The circuit board 2 may be accommodated in the accommodating space 10. Specifically, the circuit board 2 may be mounted in the second accommodating cavity 102. A manner of mounting the circuit board 2 in the housing 1 includes but is not limited to clamping, screw connection, or adhering.

The circuit board 2 is configured to integrate a control chip or the like. The control chip may be, for example, an application processor (application processor, AP), a double data rate (double data rate, DDR) synchronous dynamic random access memory, or a universal flash storage (universal flash storage, UFS). The circuit board 2 is electrically connected to all functional components such as the wireless communication module 6, the wireless charging module 5, the battery 3, and the speaker module 4, to perform operations such as signal control and data signal processing between different functional components.

The circuit board 2 may be a rigid circuit board, a flexible circuit board, or a rigid-flex circuit board. The circuit board 22 may be an FR-dielectric board, a Rogers (Rogers) dielectric board, a hybrid FR- and Rogers dielectric board, or the like. Herein, FR— is a code name of a level of a flame-retardant material; and the Rogers dielectric board is a high-frequency board.

The wireless communication module 6 may be integrated on the circuit board 2. For example, the wireless communication module 6 may be fastened on the circuit board 2 via welding. Optionally, the wireless communication module 6 may be a Bluetooth module, an infrared module, or a Wi-Fi module. The earphone 100 may exchange a wireless signal with an electronic product by using the wireless communication module 6, to receive sound information of the electronic product.

The battery 3 is configured to supply power to functional components such as the circuit board 2, the wireless communication module 6, and the speaker module 4 in the earphone 100. The battery 3 may include but is not limited to a Ni—Cd battery, a Ni-MH battery, a lithium battery, or a battery of another type. In addition, there may be one or more batteries 3 in this embodiment of this application. A shape of the battery 3 includes but is not limited to a cuboid, a cylinder, a frustum, or the like. In some examples, the battery 3 may be disposed in the second accommodating cavity 102; and the battery 3 is disposed on a side, close to the first accommodating cavity 101, of the circuit board 2. In another example, the battery 3 may be disposed on a side, away from the first accommodating cavity 101, of the circuit board 2. A manner of mounting the battery 3 in the housing 1 includes but is not limited to clamping, screw connection, or adhering.

Figure 3:
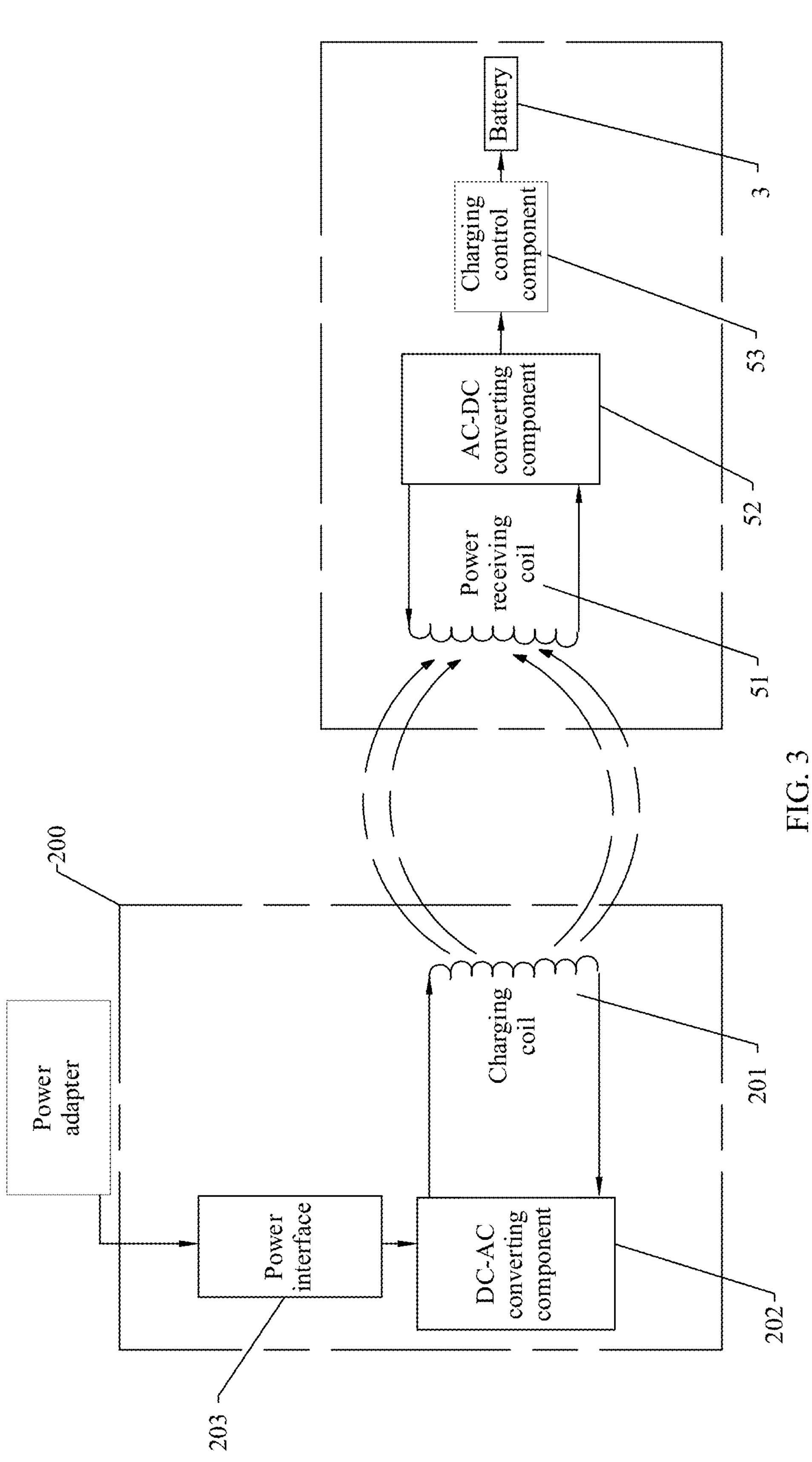
FIG. 3 is a schematic diagram of charging connection between the earphone shown in FIG. 1 and FIG. 2 and a wireless charging dock.

The wireless charging module 5 may be integrated on the circuit board 2 and wirelessly charge the battery 3 in the earphone 100. Specifically, refer to FIG. 3. FIG. 3 is a schematic diagram of charging connection between the earphone 100 shown in FIG. 1 and FIG. 2 and a wireless charging dock 200. In this embodiment, the wireless charging module 5 includes a power receiving coil 51, an AC-DC converting component 52, and a charging control component 53. All of the power receiving coil 51, the AC-DC converting component 52, and the charging control component 53 are electrically connected to the circuit board 2.

The power receiving coil 51 may receive a wireless charging input of the wireless charging dock 200 of the earphone 100. Certainly, this application is not limited thereto. The power receiving coil 51 may also receive a wireless charging input of another terminal that supports wireless charging. The power receiving coil 51 is a receive (Rx) coil. The AC-DC converting component 52 may be an Rx chip.

The wireless charging dock 200 includes a power interface 203, a charging coil 201, and a DC-AC converting component 202. The charging coil 201 may be a transmit (Tx) coil. The DC-AC converting component 202 may be a Tx chip.

In embodiments of this application, the wireless charging dock 200 is used as a transmit end of wireless charging signals; the earphone 100 is used as a receive end of wireless charging signals; and the wireless charging dock 200 wirelessly charges the earphone 100. Specifically, the DC-AC converting component 202 of the wireless charging dock 200 may receive a DC electrical signal input through the power interface 203. The DC-AC converting component 202 can convert the DC electrical signal into an AC electrical signal, and then input the AC electrical signal to the charging coil 201. The charging coil 201 can generate an alternating electromagnetic field in response to the AC electrical signal.

The power receiving coil 51 of the earphone 100 is coupled to the charging coil 201. The power receiving coil (namely, the Rx coil) 51 may generate an AC electrical signal by inducing the alternating electromagnetic field emitted by the charging coil (namely, the Tx coil) 201; and input the AC electrical signal to the AC-DC converting component 52. The AC-DC converting component 52 may rectify the AC electrical signal into a DC electrical signal, and input the DC electrical signal to the charging control component 53. The charging control component 53 may charge the battery 3 according to the DC electrical signal.

Certainly, this application is not limited thereto. In some other examples, the earphone 100 may further support wired charging. Specifically, the housing 1 is provided with a charging interface. The charging interface is electrically connected to the circuit board 2. The charging interface may be connected to a wired charger (also referred to as a power adapter) to receive a charging input from the wired charger for the battery 3. For example, the charging interface may be a universal serial bus (universal serial bus, USB) interface.

Refer to FIG. 2 again. The speaker module 4 may be mounted in the accommodating space 10. The speaker module 4 is on a side, close to the sound output hole 110, of the battery 3. Specifically, the speaker module 4 may be mounted in the first accommodating cavity 101. A manner of assembling the speaker module 4 and the housing 1 includes but is not limited to clamping, threaded connection, adhering, and the like. The speaker module 4 is electrically connected to the circuit board 2 to obtain an audio electrical signal such as music or a voice. The speaker module 4 can convert the audio electrical signal into a sound signal to support external audio playing.

The speaker module 4 used in the earphone 100 in the foregoing embodiment is a moving-coil woofer. This not only enables the earphone 100 to have performance of a low-frequency sound range, but also makes the earphone 100 affordable. However, the moving-coil woofer has a large vibration mass and a poor transient feature. Mass distribution, diaphragm compliance, and asymmetric distribution of BL electromagnetic driving force may generate different degrees of rocking vibration and different frequencies of split vibration. As a result, a high-frequency response generates a serious peak and valley, and performance of a high-frequency sound range cannot be implemented. Consequently, performance of the earphone 100 in externally playing audio is relatively poor and a sound effect is bad.

Figure 4:
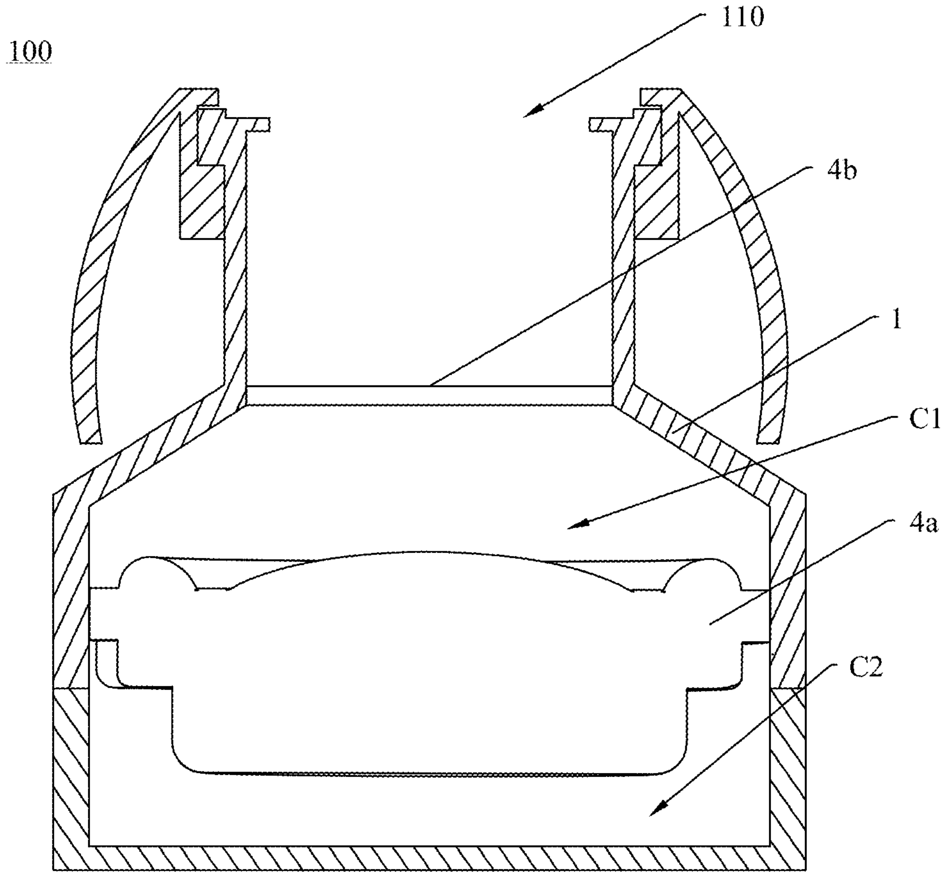
FIG. 4 is a sectional view of a section of an earphone according to some other embodiments of this application.

Refer to FIG. 4. FIG. 4 is a sectional view of a section of an earphone 100 according to some other embodiments of this application. In the embodiments, the speaker module 4 includes a first speaker unit **4*a* and a second speaker unit 4*b***.

The first speaker unit **4*a* and the second speaker unit 4*b* are disposed in the housing 1 in a spaced manner. Both the first speaker unit 4*a* and the second speaker unit 4*b* produce sound towards the sound output hole 110. A sound production frequency of the second speaker unit 4*b* is greater than a sound production frequency of the first speaker unit 4*a*. In this way, the earphone 100 includes the first speaker unit 4*a* and the second speaker unit 4*b* that have different sound production frequencies, so that a difference between the sound production frequencies of the first speaker unit 4*a* and the second speaker unit 4*b* can be used to enable the earphone 100 to have a relatively good sound expression in sound ranges of different frequencies, thereby improving a sound output effect of the speaker module 4**.

Specifically, in the embodiments, the first speaker unit **4*a* may be used as a woofer. For example, the first speaker unit 4*a* may be a moving-coil woofer. The second speaker unit 4*b* may be a tweeter. For example, the second speaker unit 4*b*** may be a moving-iron speaker unit, a planar voice coil speaker unit, or a piezoelectric ceramic speaker unit.

In the embodiments of this application, the first speaker unit **4*a* is used as a woofer, and the second speaker unit 4*b* is used as a tweeter, so that the earphone 100 is enabled to have good expressions in both a low-frequency sound range and a high-frequency sound range, thereby improving a sound output effect of the speaker module 4**.

Figure 5:
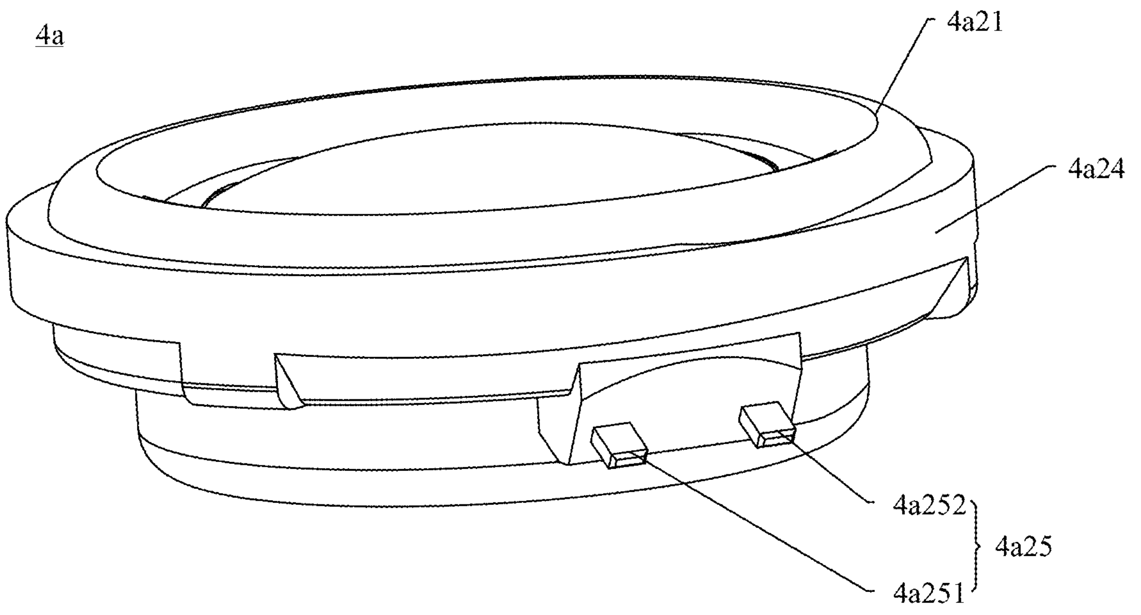
FIG. 5 is a schematic diagram of a structure of a first speaker unit of the earphone shown in FIG. 4.
Figure 6:
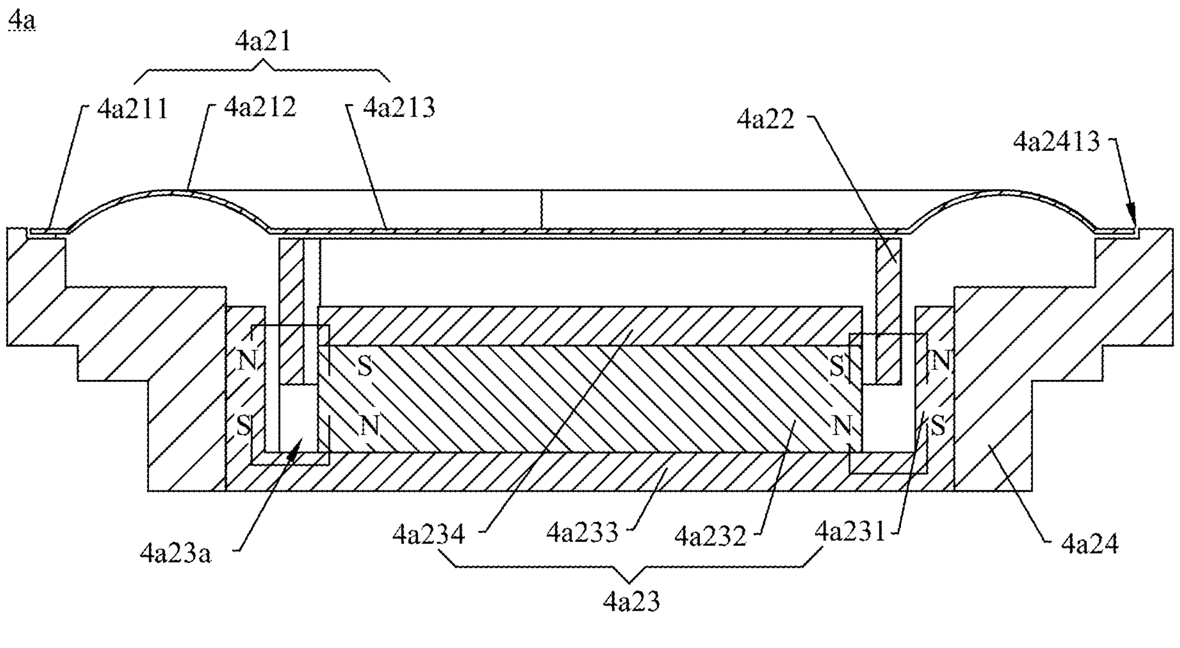
FIG. 6 is a schematic diagram of a sectional structure of the first speaker unit shown in FIG. 5.

Refer to FIG. 5 and FIG. 6. FIG. 5 is a schematic diagram of a structure of the first speaker unit **4*a* of the earphone shown in FIG. 4. FIG. 6 is a schematic diagram of a sectional structure of the first speaker unit 4*a* shown in FIG. 5. In this embodiment, the first speaker unit 4***a* includes a first diaphragm assembly 4*a*21, a first voice coil 4*a*22, a first magnetic circuit system 4*a*23, a basin frame 4*a*24, and a wiring terminal 4*a*25.

It can be understood that FIG. 5, FIG. 6, and the following related accompanying drawings merely show examples of some components included in the first speaker unit 4*a*. Actual sizes, actual locations, and actual structures of these components are not limited by FIG. 5, FIG. 6, and the following accompanying drawings.

Specifically, the first speaker unit 4*a* is fastened in the housing 1 by using the basin frame 4*a*24. A manner of assembling the basin frame 4*a*24 and the housing 1 includes but is not limited to clamping, threaded connection, adhering, and the like. The basin frame 4*a*24 is used as a "support skeleton" of the first speaker unit 4*a*, and is configured to support the first diaphragm assembly 4*a*21, the first voice coil 4*a*22, and the first magnetic circuit system 4*a*23. A material of the basin frame 4*a*24 includes but is not limited to metal, plastic, and a combination of metal and plastic. The basin frame 4*a*24 may be an integrally formed member, that is, the basin frame 4*a*24 is of an integral structure. This helps improve connection strength of the basin frame 4*a*24. Certainly, this application is not limited thereto. The basin frame 4*a*24 may be alternatively formed by assembling different parts, and a plurality of different parts may be connected via clamping, threaded connection, adhering, welding, or the like.

Still refer to FIG. 6. An inner peripheral surface of the basin frame 4*a*24 is provided with a circular groove 4*a*2413 that is recessed in a direction away from a central axis of the basin frame 4*a*24. The circular groove 4*a*2413 takes the shape of a ring extending in a circumferential direction of the basin frame 4*a*24. An end surface, extending to an open end of the basin frame 4*a*24, of the circular groove 4*a*2413 is an end surface at an end facing the sound output hole 110. An outer edge of the first diaphragm assembly 4*a*21 is accommodated in the circular groove 4*a*2413 and fastened on a wall surface, directly opposite the sound output hole 110, of the circular groove 4*a*2413. Because the outer edge of the first diaphragm assembly 4*a*21 is accommodated in the circular groove 4*a*2413 and fastened on the wall surface, directly opposite the sound output hole 110, of the circular groove 4*a*2413, it is convenient to effectively support the first diaphragm assembly 4*a*21 by using the circular groove 4*a*2413. In addition, disposing of the circular groove 4*a*2413 can increase a volume of space in the basin frame 4*a*24, which helps set a size of the first diaphragm assembly 4*a*21 to be larger, thereby helping enlarge an effective vibration area of the first diaphragm assembly 4*a*21 and improving a sound output effect of the first speaker unit 4*a*. It can be understood that the basin frame 4*a*24 may not be provided with the circular groove 4*a*2413, and that the outer edge of the first diaphragm assembly 4*a*21 may be connected to the end surface at the open end of the basin frame 4*a*24.

It should be noted that an effective vibration area of the diaphragm assembly in this specification is an area of a part of the diaphragm assembly capable of pushing air movement.

An outer surface of the first diaphragm assembly 4*a*21 faces the sound output hole 110, so that the first speaker unit 4*a* is enabled to produce sound towards the sound output hole 110. The first speaker unit 4*a* can divide the housing 1 into a front cavity C1 and a rear cavity C2 (with reference to FIG. 4) by using the first diaphragm assembly 4*a*21. The first voice coil 4*a*22, the first magnetic circuit system 4*a*23, and the basin frame 4*a*24 are disposed in the rear cavity C2. The sound output hole 110 is communicated with the front cavity C1. Certainly, this application is not limited thereto. In some other examples, the first speaker unit 4*a* may further include a shell. The first speaker unit 4*a* is fastened in the housing 1 by using the shell. The basin frame 4*a*24 is fastened on an inner wall of the shell. The first diaphragm assembly 4*a*21 divides the shell into a front cavity and a rear cavity. The front cavity of the shell is communicated with the sound output hole 110.

It needs to be explained that an "outer surface" of the first diaphragm assembly 4*a*21 is a surface on a side, away from an interior of the basin frame 4*a*24, of the first diaphragm assembly 4*a*21, and that an inner surface of the first diaphragm assembly 4*a*21 is opposite to the outer surface of the first diaphragm assembly 4*a*21.

Still refer to FIG. 6. The first diaphragm assembly 4*a*21 includes a first connecting portion 4*a*211, a first corrugated rim 4*a*212, and a first dome 4*a*213 surrounded by the first corrugated rim 4*a*212.

The first connecting portion 4*a*211 takes the shape of a circular sheet. For example, the first connecting portion 4*a*211 is a circular ring or a rectangular ring. The first connecting portion 4*a*211 is disposed via laminating on the wall surface, directly opposite the sound output hole 110, of the circular groove 4*a*2413, so that the first diaphragm assembly 4*a*21 is connected to the basin frame 4*a*24 by using the first connecting portion 4*a*211. A manner of connecting the first connecting portion 4*a*211 and the circular groove 4*a*2413 includes but is not limited to adhering, clamping, welding, or screw connection.

An outer peripheral edge of the first corrugated rim 4*a*212 is connected to an inner peripheral edge of the first connecting portion 4*a*211. A section of the first corrugated rim 4*a*212 takes the shape of an arc or an approximate arc. A track by which the first corrugated rim 4*a*212 extends in the circumferential direction of the basin frame 4*a*24 takes the shape of a circle or a rectangle. The first corrugated rim 4*a*212 protrudes towards the sound output hole 110. In this way, the first corrugated rim 4*a*212 is enabled to deform when subjected to external force, so that the first dome 4*a*213 can vibrate in an axial direction of the first diaphragm assembly 4*a*21 relative to the first connecting portion 4*a*211. Certainly, it can be understood that the first corrugated rim 4*a*212 may alternatively protrude in a direction away from the sound output hole 110.

In some examples, the first diaphragm assembly 4*a*21 is an integrally formed member, that is, the first connecting portion 4*a*211, the first corrugated rim 4*a*212, and the first dome 4*a*213 are of an integral structure. The setting helps improve structural strength of the first diaphragm assembly 4*a*21 and facilitates processing and manufacturing of the first diaphragm assembly 4*a*21. Certainly, this application is not limited thereto. The first connecting portion 4*a*211, the first corrugated rim 4*a*212, and the first dome 4*a*213 may be separately formed members. The first connecting portion 4*a*211 and the first corrugated rim 4*a*212 may be connected via adhering. The first corrugated rim 4*a*212 and the first dome 4*a*213 may be connected via adhering. A material of the first diaphragm assembly 4*a*21 includes but is not limited to metal, plastic, plant fiber, and animal fiber.

The first voice coil 4*a*22 is connected to an inner surface of the first dome 4*a*213 (namely, a surface on a side away from the sound output hole 110). A manner of connecting the first voice coil 4*a*22 and the first dome 4*a*213 includes but is not limited to adhering.

The first magnetic circuit system 4*a*23 is fastened in the basin frame 4*a*24. The first magnetic circuit system 4*a*23 has a circular magnetic gap 4*a*23*a*. An end, away from the first diaphragm assembly 4*a*21, of the first voice coil 4*a*22 can be extended into the magnetic gap 4*a*23*a*, so that the first magnetic circuit system 4*a*23 can cooperate with the first voice coil 4*a*22, to drive the first diaphragm assembly 4*a*21 to vibrate synchronously. Specifically, after the first voice coil 4*a*22 is powered on, an induced magnetic field may be generated, and the first magnetic circuit system 4*a*23 may respond to the induced magnetic field, so that the first voice coil 4*a*22 is displaced under action of magnetic force of the first magnetic circuit system 4*a*23, to drive the first diaphragm assembly 4*a*21 to vibrate, thereby pushing air in the front cavity C1 to vibrate and generate sound, where the sound is output from the sound output hole 110.

Still refer to FIG. 6. The first magnetic circuit system 4*a*23 includes an edge magnetic portion 4*a*231, a first central magnetic portion 4*a*232, and a second central magnetic portion 4*a*233. The edge magnetic portion 4*a*231 is disposed at an outer circumference of the first central magnetic portion 4*a*232 to define the magnetic gap 4*a*23*a* with the first central magnetic portion 4*a*232. A magnetizing direction of the edge magnetic portion 4*a*231 is opposite to a magnetizing direction of the first central magnetic portion 4*a*232, so that the edge magnetic portion 4*a*231 and the first central magnetic portion 4*a*232 can form a magnetic loop used to drive the first voice coil 4*a*22 to move. For example, in an axial direction of the basin frame 4*a*24 and towards a direction away from the first diaphragm assembly 4*a*21, the magnetizing direction of the edge magnetic portion 4*a*231 is from a north pole (N) to a south pole (S), and the magnetizing direction of the first central magnetic portion 4*a*232 is from the south pole (S) to the north pole (N).

Still refer to FIG. 6. The edge magnetic portion 4*a*231 may take the shape of a ring. For example, the edge magnetic portion 4*a*231 takes the shape of a circular ring or a rectangular ring. Certainly, it can be understood that the edge magnetic portion 4*a*231 may alternatively not be ring-shaped. There are a plurality of edge magnetic portions 4*a*231. The plurality of edge magnetic portions 4*a*231 are spaced apart in a circumferential direction of the first central magnetic portion 4*a*232.

The second central magnetic portion 4*a*233 blocks an end, away from the first diaphragm assembly 4*a*21, of the edge magnetic portion 4*a*231. The first central magnetic portion 4*a*232 and the second central magnetic portion 4*a*233 are disposed via laminating. The second central magnetic portion 4*a*233 and the edge magnetic portion 4*a*231 may be an integrally formed member, that is, the second central magnetic portion 4*a*233 and the edge magnetic portion 4*a*231 may be of an integral structure. Certainly, this application is not limited thereto. The second central magnetic portion 4*a*233 and the edge magnetic portion 4*a*231 may be connected via adhering, clamping, threaded connection, or the like.

Specifically, the second central magnetic portion 4*a*233 may be a member made of a magnetically conductive material. In this way, leakage of a magnetic line can be restricted by using the second central magnetic portion 4*a*233, thereby increasing magnetic induction intensity of the first magnetic circuit system 4*a*23. Certainly, this application is not limited thereto. In some other examples, the second central magnetic portion 4*a*233 may be a magnet. Specifically, the magnet is magnetic iron or magnetic steel.

In some examples, both the edge magnetic portion 4*a*231 and the first central magnetic portion 4*a*232 may be magnets. For example, both the edge magnetic portion 4*a*231 and the first central magnetic portion 4*a*232 are magnetic iron or magnetic steel. Certainly, this application is not limited thereto. In another embodiment, one of the edge magnetic portion 4*a*231 and the first central magnetic portion 4*a*232 is a magnet, and the other one is a member made of a magnetically conductive material.

The first magnetic circuit system 4*a*23 further includes a magnetically conductive yoke 4*a*234, to increase the magnetic induction intensity of the first magnetic circuit system 4*a*23. The magnetically conductive yoke 4*a*234 is disposed on a side, facing the first diaphragm assembly 4*a*21, of the first central magnetic portion 4*a*232, and is configured to restrict leakage of the magnetic line, thereby improving driving force for the first diaphragm assembly 4*a*21.

Specifically, an outer peripheral surface of the magnetically conductive yoke 4*a*234 is flush with an outer peripheral surface of the first central magnetic portion 4*a*232 in an axial direction of the first magnetic circuit system 4*a*23. This helps further improve a restriction effect of the magnetically conductive yoke 4*a*234 on the magnetic line, and increase the magnetic induction intensity of the first magnetic circuit system 4*a*23. In addition, the magnetically conductive yoke 4*a*234 does not affect the magnetic gap 4*a*23*a*. This helps improve suitability between the first magnetic circuit system 4*a*23 and the first voice coil 4*a*22.

Refer to FIG. 5. The wiring terminal 4*a*25 is disposed on the basin frame 4*a*24. Specifically, the wiring terminal 4*a*25 is disposed on an outer side of the basin frame 4*a*24. For example, the wiring terminal 4*a*25 may protrude from an outer peripheral surface of the basin frame 4*a*24. For another example, a groove may be formed in the outer peripheral surface of the basin frame 4*a*24; and the wiring terminal 4*a*25 may be disposed in the groove. A person skilled in the art may design a manner of disposing the wiring terminal 4*a*25 based on an actual requirement, provided that the wiring terminal 4*a*25 is disposed on the outer side of the basin frame 4*a*24.

The wiring terminal 4*a*25 includes a positive wiring terminal 4*a*252 and a negative wiring terminal 4*a*251.

The positive wiring terminal 4*a*252 is provided with an electrically conductive wiring portion that is disposed in the basin frame 4*a*24. The electrically conductive wiring portion may be electrically connected to a positive lead of the first voice coil 4*a*22. In some examples, the positive lead of the first voice coil 4*a*22 may be welded to the electrically conductive wiring portion.

The negative wiring terminal 4*a*251 is provided with an electrically conductive extending portion that is disposed in the basin frame 4*a*24. The electrically conductive extending portion may be electrically connected to a negative lead of the first voice coil 4*a*22. In some examples, the negative lead of the first voice coil 4*a*22 may be welded to the electrically conductive extending portion.

In this embodiment of this application, because both the positive lead and the negative lead of the first voice coil 4*a*22 are thin, structural strength of the positive lead and the negative lead is weak, and the positive lead and the negative lead are easy to damage due to scratching. For this reason, the electrically conductive wiring portion in the basin frame 4*a*24 is electrically connected to the positive lead of the first voice coil 4*a*22, so that a length of the positive lead can be shortened, to avoid a problem that the positive lead is damaged due to scratching with the basin frame 4*a*24; and the electrically conductive extending portion in the basin frame 4*a*24 is electrically connected to the negative lead of the first voice coil 4*a*22, so that a length of the negative lead can be shortened, to avoid a problem that the negative lead is damaged due to scratching with the basin frame 4$a$24. This helps improve working reliability of the first voice coil 4$a$22.

The first speaker unit 4$a$ is electrically connected to the circuit board 2 through the positive wiring terminal 4$a$252 and the negative wiring terminal 4$a$251, thereby obtaining an audio electrical signal such as music and a voice.

Figure 7:
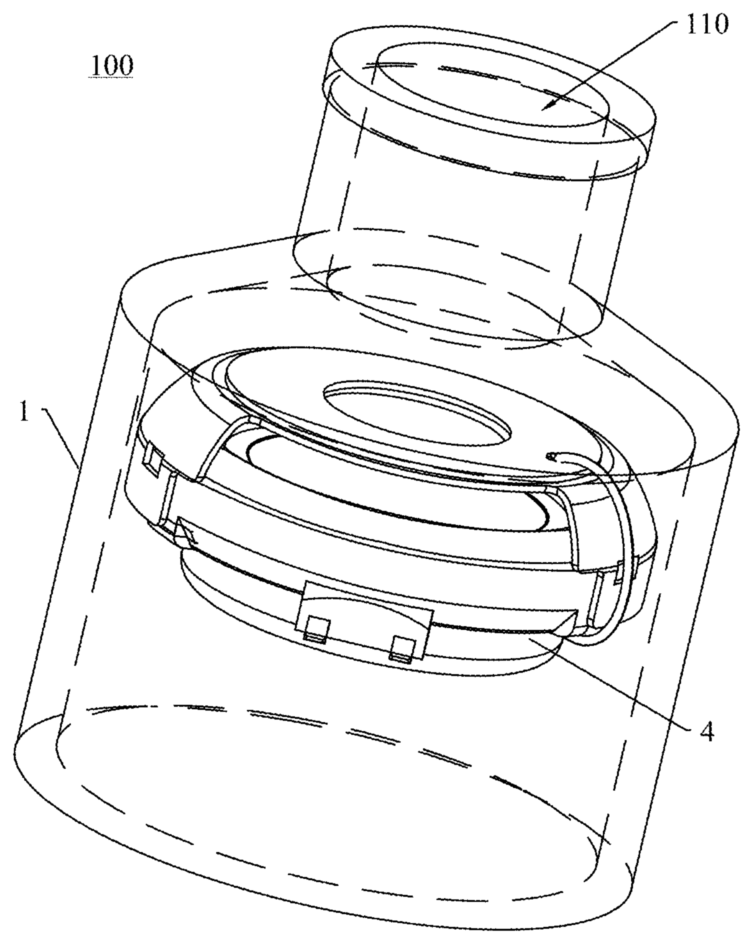
FIG. 7 is a schematic diagram of a partial structure of an earphone according to still some other embodiments of this application.
Figure 8:
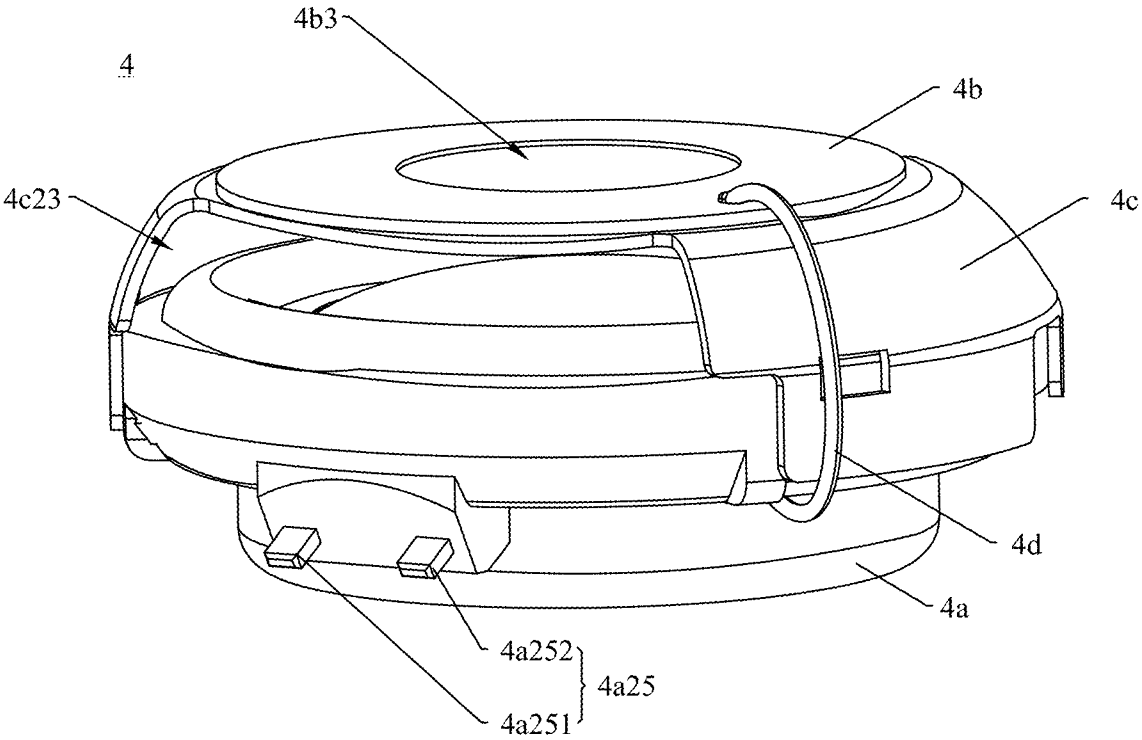
FIG. 8 is a schematic diagram of a structure of a speaker module of the earphone shown in FIG. 7.

As described above, the first speaker unit 4$a$ and the second speaker unit 4$b$ are disposed in the housing 1 in a spaced manner. In this way, the first speaker unit 4$a$ and the second speaker unit 4$b$ need to be separately mounted in the housing 1, resulting in a complex assembly process and low assembly efficiency. Moreover, disposing the first speaker unit 4$a$ and the second speaker unit 4$b$ in the housing 1 in a spaced manner goes against structural compactness of the speaker module 4. To resolve the technical problems, in this embodiment of this application, refer to FIG. 7 and FIG. 8. FIG. 7 is a schematic diagram of a partial structure of an earphone 100 according to still some other embodiments of this application. FIG. 8 is a schematic diagram of a structure of a speaker module 4 of the earphone 100 shown in FIG. 7. In this embodiment, the speaker module 4 further includes a bracket 4$c$. The second speaker unit 4$b$ may be connected to the basin frame 4$a$24 of the first speaker unit 4$b$ by using the bracket 4$c$, thereby implementing fixed connection between the first speaker unit 4$a$ and the second speaker unit 4$b$. Therefore, during mounting of the speaker module 4, the speaker module 4 can be used as a whole for mounting in the housing 1, instead of separately mounting the first speaker unit 4$a$ and the second speaker unit 4$b$ into the housing 1. This can simplify mounting of the speaker module 4, and implement structural compactness of the speaker module 4.

Figure 9:
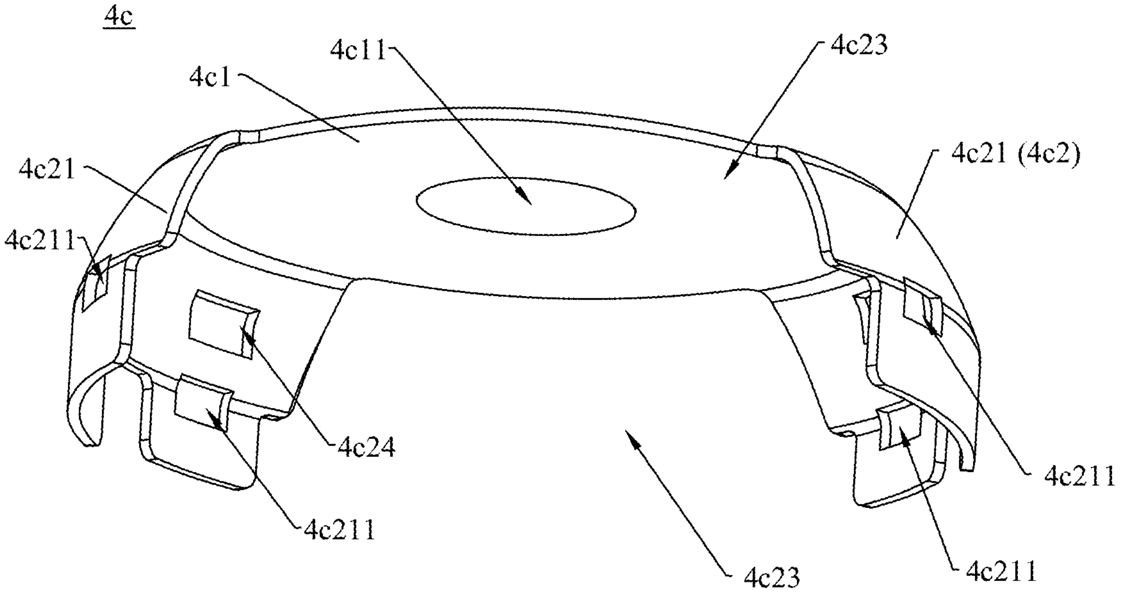
FIG. 9 is a schematic diagram of a structure of a bracket in the speaker module shown in FIG. 8.

Specifically, refer to FIG. 9. FIG. 9 is a schematic diagram of a structure of a bracket 4$c$ in the speaker module 4 shown in FIG. 8. In this embodiment, the bracket 4$c$ includes a support plate 4$c$1 and a connecting portion 4$c$2.

The support plate 4$c$1 is disposed on an axial side of the first speaker unit 4$a$. The support plate 4$c$1 is opposite an outer surface of the first diaphragm assembly 4$a$21 of the first speaker unit 4$a$. The second speaker unit 4$b$ is supported by a side, away from the first speaker unit 4$a$, of the support plate 4$c$1, that is, the second speaker unit 4$b$ is supported by a side, facing the sound output hole 110, of the support plate 4$c$1. Therefore, the second speaker unit 4$b$ can be supported by using the support plate 4$c$1, to facilitate mounting of the second speaker unit 4$b$. A manner of connecting the second speaker unit 4$b$ and the support plate 4$c$1 includes but is not limited to adhering, clamping, welding, or screw connection.

Still refer to FIG. 9 with reference to FIG. 8, to prevent the support plate 4$c$1 and the second speaker unit 4$b$ from blocking transmission of sound produced by vibration of the first diaphragm assembly 4$a$21, thereby avoiding impact on a sound production effect of the first speaker unit 4$a$. A first voice transmission channel 4$c$11 is formed in the support plate 4$c$1; and the second speaker unit 4$b$ does not cover the first voice transmission channel 4$c$11. In this way, sound produced by vibration of air pushed by vibration of the first diaphragm assembly 4$a$21 can be transmitted to the sound output hole 110 through the first voice transmission channel 4$c$11. There may be a plurality of first voice transmission channels 4$c$11, or there may be one first voice transmission channel 4$c$11. For example, the support plate 4$c$1 takes the shape of a ring to define the first voice transmission channel 4$c$11; the second speaker unit 4$b$ takes the shape of a ring extending in a circumferential direction of the support plate 4$c$1 to define an avoidance channel 4$b$3; and the avoidance channel 4$b$3 is communicated with the first voice transmission channel 4$c$11. Certainly, this application is not limited thereto. In another example, the second speaker unit 4$b$ may not take the shape of a ring; and the second speaker unit 4$b$ may cover a part of the support plate 4$c$1. For example, the second speaker unit 4$b$ may deviate from a center of the support plate 4$c$1.

An outer contour of the support plate 4$c$1 takes the shape of a circle, a rectangle, a triangle, a trapezoid, or an irregular shape. A material of the support plate 4$c$1 includes but is not limited to metal, plastic, and a combination of metal and plastic.

The connecting portion 4$c$2 is connected between an outer peripheral edge of the support plate 4$c$1 and a peripheral wall of the basin frame 4$a$24, to help the second speaker unit 4$b$ be fastened to the basin frame 4$a$24 by using the connecting portion 4$c$2. In some examples, the connecting portion 4$c$2 and the support plate 4$c$1 may be an integrally formed member, that is, the connecting portion 4$c$2 and the support plate 4$c$1 may be of an integral structure. This helps improve strength of connection between the connecting portion 4$c$2 and the support plate 4$c$1. In some other examples, the connecting portion 4$c$2 may alternatively be connected to the support plate 4$c$1 via adhering, clamping, welding, screw connection, or the like. A manner of connecting the connecting portion 4$c$2 and the basin frame 4$a$24 includes but is not limited to clamping, adhering, welding, or screw connection. A material of the connecting portion 4$c$2 includes but is not limited to metal, plastic, and a combination of metal and plastic.

Specifically, still refer to FIG. 9. The connecting portion 4$c$2 includes at least two sub-portions 4$c$21. The at least two sub-portions 4$c$21 are spaced apart in the circumferential direction of the support plate 4$c$1. Each sub-portion is connected between the outer peripheral edge of the support plate 4$c$1 and the peripheral wall of the basin frame 4$a$24.

Still refer to FIG. 9. Each sub-portion 4$c$21 takes the shape of a plate extending in the circumferential direction of the support plate 4$c$1. The setting helps improve structural strength of the sub-portion 4$c$21 while reducing a size and a weight of the bracket 4$c$, thereby improving reliability of connection between the bracket 4$c$ and the basin frame 4$a$24, and further improving reliability of fastening the first speaker unit 4$a$ and the second speaker unit 4$b$ by the bracket 4$c$.

Specifically, still refer to FIG. 9. A clamping hole 4$c$211 is formed in each sub-portion 4$c$21. A clamping rib (not shown in the figure) is formed on the outer peripheral surface of the basin frame 4$a$24. The clamping rib is clamped in the clamping hole 4$c$211. Therefore, detachable connection between the bracket 4$c$ and the basin frame 4$a$24 is implemented. Certainly, this application is not limited thereto. Alternatively, in another implementation, a clamping rib is formed on each sub-portion 4$c$21; a clamping hole is formed in the outer peripheral surface of the basin frame 4$a$24; and the clamping rib is clamped in the clamping hole. This can also implement detachable connection between the bracket 4$c$ and the basin frame 4$a$24.

Because the support plate 4$c$1 is spaced apart from the first speaker unit 4$a$, the sub-portions 4$c$21 can be connected between the outer peripheral edge of the support plate 4$c$1 and the peripheral wall of the basin frame 4$a$24. In this way, a sound transmission channel 4$c$23 may be formed between two adjacent sub-portions 4$c$21. Sound produced by vibration of the first diaphragm assembly 4$a$21 is transmitted by using the sound transmission channel 4$c$23, so that a sound production effect of the first speaker unit 4$a$ is improved.

Still refer to FIG. 9, to prevent the sub-portions 4*c*21 from blocking the first speaker unit 4*a* and affecting sound transmission of the first speaker unit 4*a*, thereby improving a sound output effect of the first speaker unit 4*a*. A second voice transmission channel 4*c*24 is formed in a part, between the first diaphragm assembly 4*a*21 and the support plate 4*c*1, of each sub-portion 4*c*21. Certainly, this application is not limited thereto. Alternatively, the sub-portion 4*c*21 is not provided with the second voice transmission channel 4*c*24.

Figure 10:
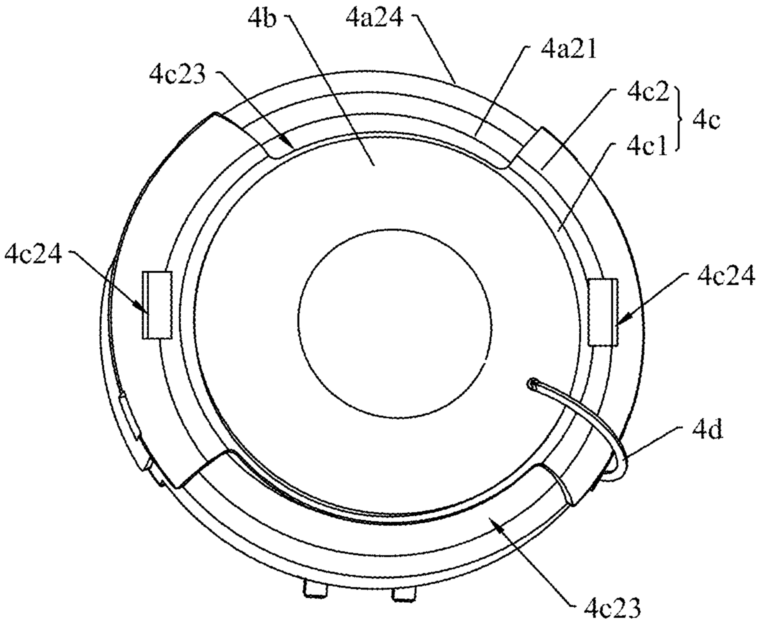
FIG. 10 is a schematic diagram of the speaker module shown in FIG. 8 from another perspective.

Refer to FIG. 10, to further improve a transmission effect of the sound transmission channel 4*c*23 for sound produced by the first speaker unit 4*a*. FIG. 10 is a schematic diagram of the speaker module 4 shown in FIG. 8 from another perspective. In a plane parallel to the first diaphragm assembly 4*a*21, a part of an orthographic projection of the sound transmission channel 4*c*23 is within an outer contour of an orthographic projection of the first diaphragm assembly 4*a*21.

Still refer to FIG. 10, to further improve a transmission effect of the second voice transmission channel 4*c*24 for sound of the first speaker unit 4*a*. In the plane parallel to the first diaphragm assembly 4*a*21, an orthographic projection of the second voice transmission channel 4*c*24 is within the outer contour of the orthographic projection of the first diaphragm assembly 4*a*21. In this way, the second voice transmission channel 4*c*24 may be opposite the first diaphragm assembly 4*a*21 in the axial direction of the first speaker unit 4*a*, thereby further facilitating sound output of the first speaker unit 4*a*, and ensuring a sound output effect of the first speaker unit 4*a*.

Figure 11:
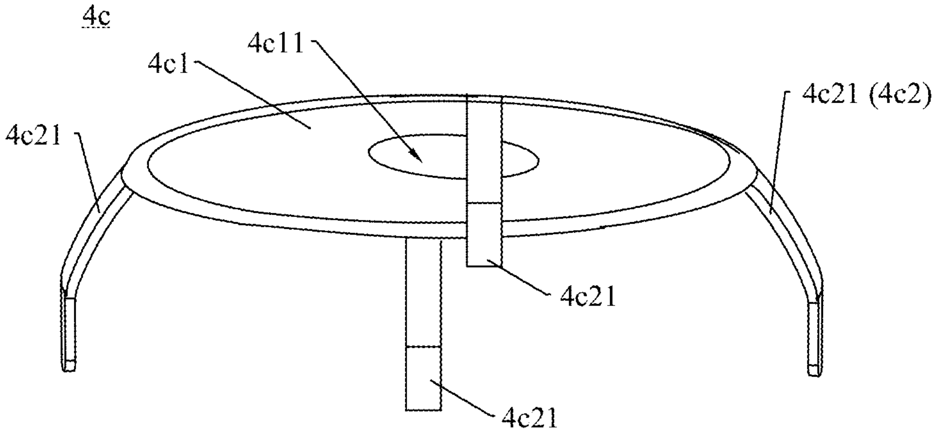
FIG. 11 is a schematic diagram of a structure of a bracket according to some other embodiments of this application.

Refer to FIG. 11. FIG. 11 is a schematic diagram of a structure of a bracket 4*c* according to some other embodiments of this application. The structure of the bracket 4*c* shown in FIG. 11 differs from the structure of the bracket 4*c* shown in FIG. 9 in that the second voice transmission channel 4*c*24 is not formed in each sub-portion 4*c*21, and that each sub-portion 4*c*21 takes the shape of a rod. This can reduce a size and a weight of the sub-portion 4*c*21, thereby reducing a weight of the speaker module 4 and a size of the speaker module 4. This also helps increase an area of the sound transmission channel 4*c*23, and improve a sound output effect of the first speaker module 4*a*.

Figure 12A:
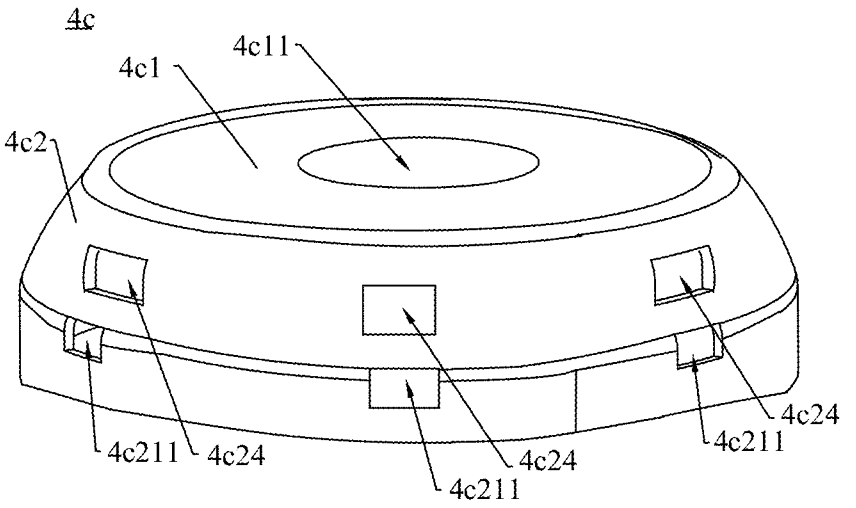
FIG. 12A is a schematic diagram of a structure of a bracket according to still some other embodiments of this application.

Refer to FIG. 12A. FIG. 12A is a schematic diagram of a structure of a bracket 4*c* according to still some other embodiments of this application. Alternatively, the connecting portion 4*c*2 may not include a plurality of spaced sub-portions; and the connecting portion 4*c*2 takes the shape of a closed ring extending in an entire circumferential direction of the basin frame 4*a*24. These settings help improve structural strength of the connecting portion 4*c*2, thereby improving reliability of connection between the bracket 4*c* and the basin frame 4*a*24, and further improving reliability of fastening the first speaker unit 4*a* and the second speaker unit 4*b* by the bracket 4*c*.

Specifically, still refer to FIG. 12A. A clamping hole 4*c*211 is formed in the connecting portion 4*c*2. A clamping rib (not shown in the figure) is formed on the outer peripheral surface of the basin frame 4*a*24. The clamping rib is clamped in the clamping hole 4*c*211. Therefore, detachable connection between the bracket 4*c* and the basin frame 4*a*24 is implemented. Certainly, this application is not limited thereto. Alternatively, in another implementation, a clamping rib is formed on the connecting portion 4*c*2; a clamping hole is formed in the outer peripheral surface of the basin frame 4*a*24; and the clamping rib is clamped in the clamping hole. This can also implement detachable connection between the bracket 4*c* and the basin frame 4*a*24.

Still refer to FIG. 12A, to prevent the connecting portion 4*c*2 from blocking the first speaker unit 4*a* and affecting sound transmission of the first speaker unit 4*a*, thereby improving a sound output effect of the first speaker unit 4*a*. A second voice transmission channel 4*c*24 is formed in a part, between the first diaphragm assembly 4*a*21 and the support plate 4*c*1, of the connecting portion 4*c*2. Certainly, this application is not limited thereto. Alternatively, the connecting portion 4*c*2 is not provided with the second voice transmission channel 4*c*24.

In the plane parallel to the first diaphragm assembly 4*a*21, an orthographic projection of the second voice transmission channel 4*c*24 is within the outer contour of the orthographic projection of the first diaphragm assembly 4*a*21, to further improve a transmission effect of the second voice transmission channel 4*c*24 for sound of the first speaker unit 4*a*. In this way, the second voice transmission channel 4*c*24 may be opposite the first diaphragm assembly 4*a*21 in the axial direction of the first speaker unit 4*a*, thereby further facilitating sound output of the first speaker unit 4*a*, and ensuring a sound output effect of the first speaker unit 4*a*.

Figure 12B:
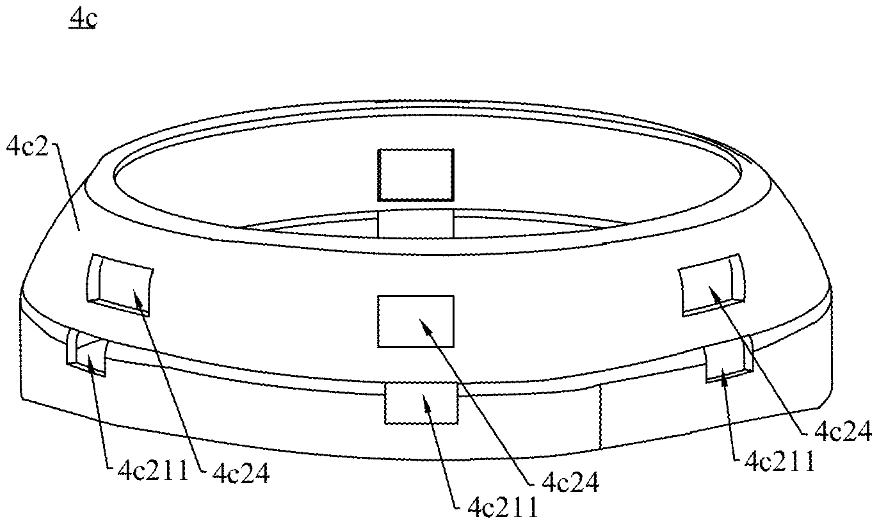
FIG. 12B is a schematic diagram of a structure of a bracket according to yet some other embodiments of this application.

Refer to FIG. 12B. FIG. 12B is a schematic diagram of a structure of a bracket 4*c* according to yet some other embodiments of this application. This embodiment differs from the foregoing embodiment in that the bracket 4*c* may not include the support plate 4*c*1 but may include the connecting portion 4*c*2, and that the second speaker unit 4*b* may be supported by an end, away from the first speaker unit 4*a*, of the connecting portion 4*c*2.

Based on the foregoing embodiment, in some embodiments of this application, the bracket 4*c* is provided with an electrically conductive portion; and an electrode of the second speaker unit 4*b* is electrically connected to the wiring terminal 4*a*25 by using the electrically conductive portion. In this way, the speaker module 4 can be electrically connected to the circuit board 2 by using the wiring terminal 4*a*25. In other words, a negative electrode of the second speaker unit 4*b* may be electrically connected to the negative wiring terminal 4*a*251 by using the electrically conductive portion; or a positive electrode of the second speaker unit 4*b* may be electrically connected to the positive wiring terminal 4*a*252 by using the electrically conductive portion; or there are two electrically conductive portions that are spaced apart in an insulated manner, the negative electrode of the second speaker unit 4*b* is electrically connected to the negative wiring terminal 4*a*251 by using one of the electrically conductive portions, and the positive electrode of the second speaker unit 4*b* is electrically connected to the positive wiring terminal 4*a*252 by using the other electrically conductive portion.

Optionally, when the positive electrode of the second speaker unit 4*b* is electrically connected to the positive wiring terminal 4*a*252 by using the electrically conductive portion, a surface of the electrically conductive portion may be provided with an insulated protective layer, to improve use reliability of the bracket 4*c*, and avoid a short circuit problem caused when the bracket 4*c* is in contact with another structure in the housing 1 of the earphone 100.

When the negative electrode of the second speaker unit 4*b* is electrically connected to the negative wiring terminal 4*a*251 by using the electrically conductive portion, the electrically conductive portion may be electrically connected to a ground point on the circuit board 2 to implement grounding, thereby improving use reliability of the bracket 4*c*, and avoiding a short circuit problem caused when the bracket 4*c* is in contact with another structure in the housing 1 of the earphone 100.

Specifically, the electrically conductive portion at least includes at least a part of the connecting portion 4c2. Specifically, the electrically conductive portion may consist of only a part of the connecting portion 4c2; the electrically conductive portion may consist of only the connecting portion 4c2; the electrically conductive portion may consist of a part of the connecting portion 4c2 and a part of the support plate 4c2; the electrically conductive portion may consist of a part of the connecting portion 4c2 and the entire support plate 4c2; or the electrically conductive portion may consist of the bracket 4c.

Based on the speaker module 4 in this embodiment of this application, the earphone 100 includes the first speaker unit 4a and the second speaker unit 4b that have different sound production frequencies, so that a difference between the sound production frequencies of the first speaker unit 4a and the second speaker unit 4b can be used to enable the earphone 100 to have a relatively good sound expression in sound ranges of different frequencies, thereby improving a sound output effect of the speaker module. In addition, the bracket 4c is provided, and the basin frame 4a24 of the first speaker unit 4a and the second speaker unit 4b are fastened by using the bracket 4c, so that the first speaker unit 4a and the second speaker unit 4b are connected together to facilitate modularization of the speaker module 4. In this way, during mounting of the speaker module 4, the first speaker unit 4a and the second speaker unit 4b can be used as a whole for mounting, so that the first speaker unit 4a and the second speaker unit 4b do not need to be separately mounted into the housing 1 of the earphone 100. This can simplify mounting of the speaker module 4, and implement structural compactness of the speaker module 4. In addition, the bracket 4c is provided with the electrically conductive portion, and the electrode of the second speaker unit 4b is electrically connected to the wiring terminal 4a25 by using the electrically conductive portion, so that an electrical connection relationship between the first speaker unit 4a and the second speaker unit 4b can be simplified at least to some extent, and at least one signal line used to electrically connect the first speaker unit 4a and the second speaker unit 4b can be eliminated. Therefore, a structure of the entire speaker module 4 is simplified, and it is convenient to connect the speaker module 4 to the circuit board 2 by using the wiring terminal 4a25.

In some embodiments of this application, the electrically conductive portion is a part of the bracket 4c; the electrically conductive portion may be a metal insert; and the other part of the bracket 4c may be a plastic member. For example, the bracket 4c is processed according to an in-mold injection technique. Based on the setting, a processing technique is simple; and structural strength of the bracket 4c is relatively high.

In some other embodiments of this application, the bracket 4c defines the electrically conductive portion. In other words, the entire bracket 4c is electrically conductive. The negative electrode of the second speaker unit 4b is electrically connected to the negative wiring terminal 4a251 by using the bracket 4c. The bracket 4c is grounded. These settings can simplify a structure of the bracket 4c.

Figure 13:
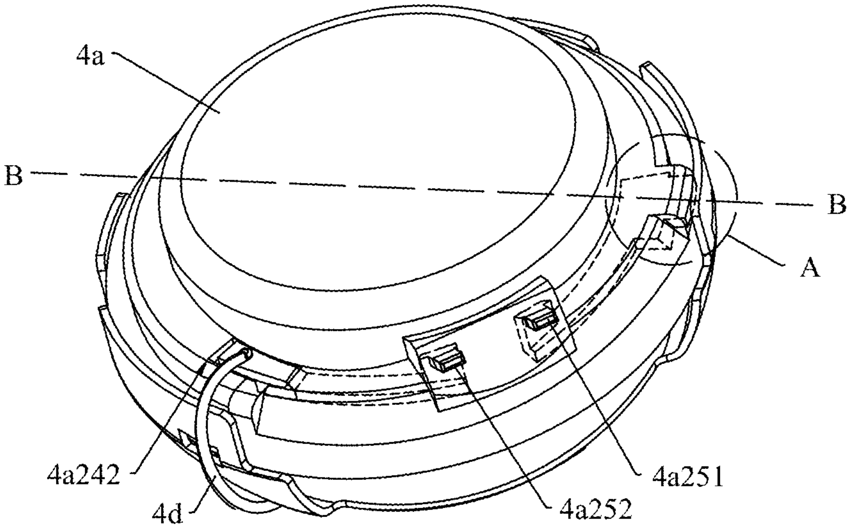
FIG. 13 is a schematic diagram of the speaker module shown in FIG. 8 from still another perspective.
Figure 14A:
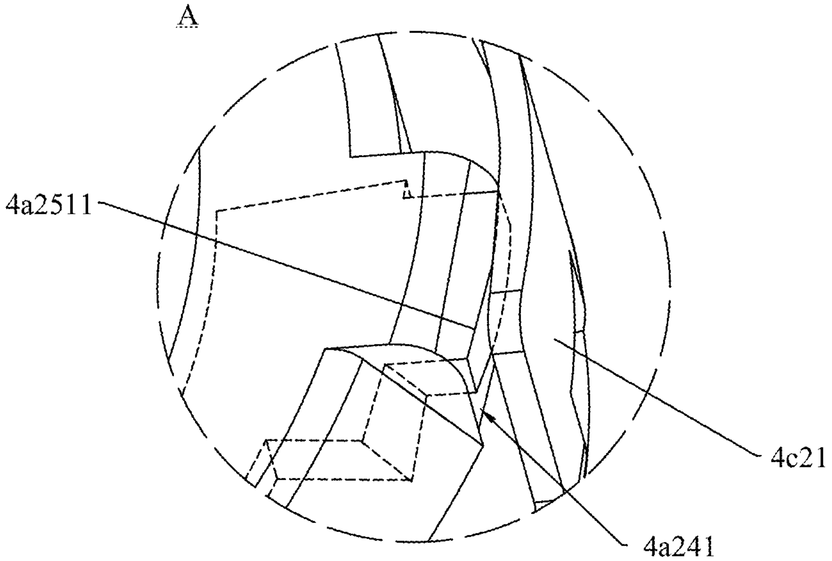
FIG. 14A is an enlarged view of a circled part A of the speaker module shown in FIG. 13.
Figure 14B:
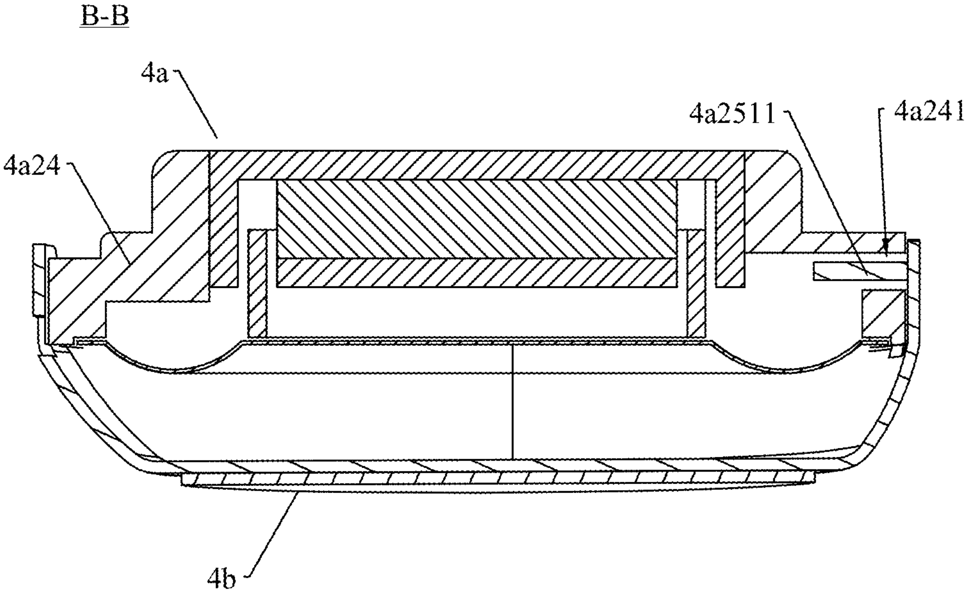
FIG. 14B is a sectional view along a line B-B of the speaker module shown in FIG. 13.
Figure 15:
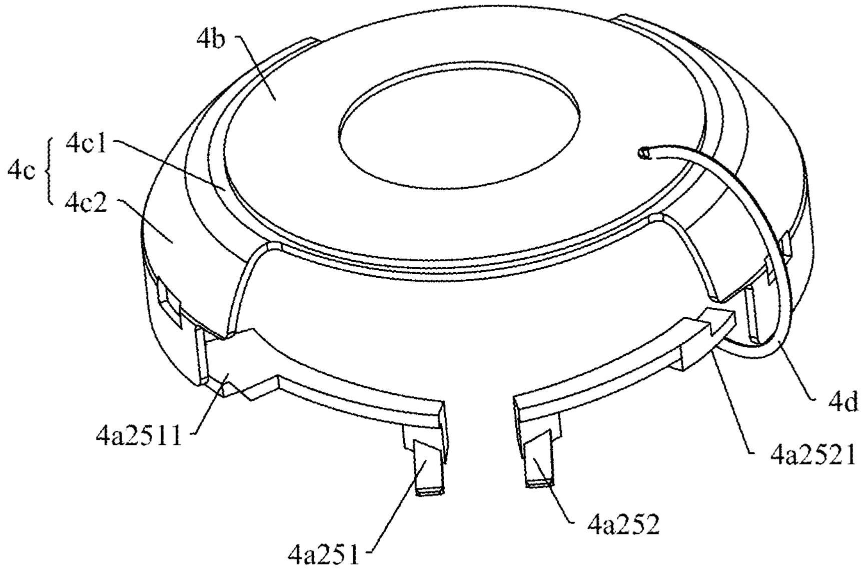
FIG. 15 is a schematic diagram of connection among a bracket, a second speaker unit, a wiring terminal, and an electrically conductive member of the speaker module shown in FIG. 8.

Further, refer to FIG. 13, FIG. 14A, FIG. 14B, and FIG. 15. FIG. 13 is a schematic diagram of the speaker module 4 shown in FIG. 8 from still another perspective. FIG. 14A is an enlarged view of a circled part A of the speaker module 4 shown in FIG. 13. FIG. 14B is a sectional view along a line B-B of the speaker module 4 shown in FIG. 13. FIG. 15 is a schematic diagram of connection among the bracket 4c, the second speaker unit 4b, the wiring terminal 4a25, and an electrically conductive member 4d of the speaker module 4 shown in FIG. 8. The peripheral wall of the basin frame 4a24 is provided with a first opening 4a241. The negative wiring terminal 4a251 is provided with an electrically conductive extending portion 4a2511 that is disposed in the basin frame 4a24. The electrically conductive extending portion 4a2511 extends into the first opening 4a241. A part, directly opposite the first opening 4a241, of the connecting portion 4c2 is connected to the electrically conductive extending portion 4a2511. For example, the part, directly opposite the first opening 4a241, of the connecting portion 4c2 is welded to the electrically conductive extending portion 4a2511.

Therefore, the second speaker unit 4b can be electrically connected to the negative wiring terminal 4a251 by using the bracket 4c. Moreover, compared with a solution in which a connecting portion 4c2 is electrically connected to the negative wiring terminal 4a251 directly, the negative wiring terminal 4a251 does not need to be extended out of the basin frame 4a24 by an excessive length, thereby avoiding interference that is with a structure in the housing 1 and that is caused when the negative wiring terminal 4a251 is extended out of the basin frame 4a24 by the excessive length. Alternatively, in another example, the peripheral wall of the basin frame 4a24 is not provided with the first opening 4a241; and the connecting portion 4c2 is electrically connected to the negative wiring terminal 4a251 directly.

Still refer to FIG. 13 and FIG. 15. The speaker module 4 further includes the electrically conductive member 4d. The positive electrode of the second speaker unit 4b is electrically connected to the positive wiring terminal 4a252 by using the electrically conductive member 4d.

Optionally, the electrically conductive member 4d may be an enameled wire, to implement insulation between the electrically conductive member 4d and the bracket 4c. Certainly, this application is not limited thereto. The electrically conductive member 4d may alternatively be a flexible printed circuit (flexible printed circuit, FPC) or a conducting wire, provided that the bracket 4c and the electrically conductive member 4d are spaced apart in an insulated manner.

Further, refer to FIG. 13. The peripheral wall of the basin frame 4a24 is provided with a second opening 4a242. The positive wiring terminal 4a252 is provided with an electrically conductive wiring portion 4a2521 that is disposed in the basin frame 4a24. The electrically conductive member 4d is extended into the basin frame 4a24 through the second opening 4a242, to be electrically connected to the electrically conductive wiring portion 4a2521. Therefore, the second speaker unit 4b can be electrically connected to the positive wiring terminal 4a252 by using the electrically conductive member 4d. Moreover, compared with a solution in which an electrically conductive member 4d is electrically connected to a positive wiring terminal 4a252 directly, the positive wiring terminal 4a252 does not need to be extended out of the basin frame 4a24 by an excessive length, thereby avoiding interference that is with a structure in the housing 1 and that is caused when the positive wiring terminal 4a252 is extended out of the basin frame 4a24 by the excessive length. Alternatively, in another example, the peripheral wall of the basin frame 4a24 is not provided with the second opening 4a242; and the electrically conductive member 4d is electrically connected to the positive wiring terminal 4a252 directly.

Figure 16:
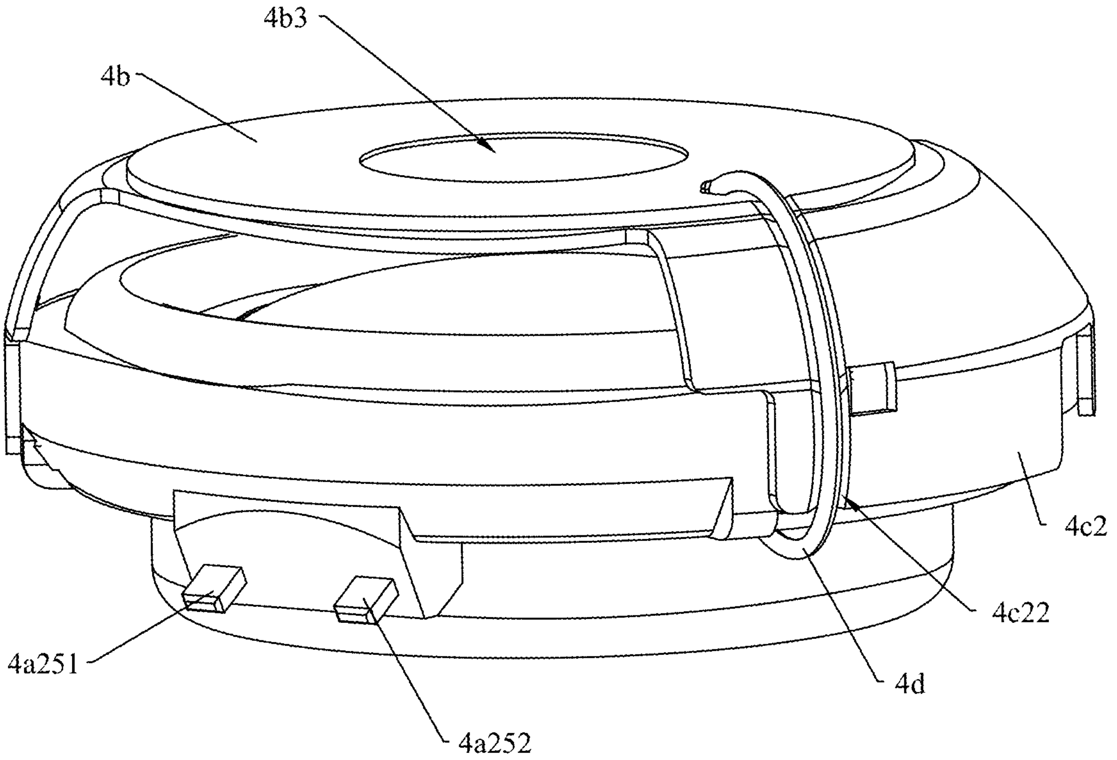
FIG. 16 is a schematic diagram of a structure of a speaker module according to some other embodiments of this application.

Refer to FIG. 16. FIG. 16 is a schematic diagram of a structure of a speaker module 4 according to some other embodiments of this application. A part of the electrically conductive member 4d is disposed on a side to which an outer surface of the connecting portion 4*c*2 faces. A cabling channel 4*c*22 may be formed in the outer surface of the connecting portion 4*c*2, and a part of the electrically conductive member 4*d* is disposed in the cabling channel 4*c*22, to avoid interference that is with another structure in the housing 1 and that is caused when the electrically conductive member 4*d* entirely protrudes from the outer surface of the connecting portion 4*c*2. Certainly, it can be understood that alternatively, the outer surface of the connecting portion 4*c*2 is not provided with the cabling channel 4*c*22.

Herein, the outer surface of the connecting portion 4*c*2 is a surface on a side, away from a central axis of the first speaker unit 4*a*, of the connecting portion 4*c*2.

Optionally, a part of the electrically conductive member 4*d* is disposed on a side to which the outer peripheral surface of the basin frame 4*a*24 faces. An avoidance groove may be formed in the outer peripheral surface of the basin frame 4*a*24, and a part of the electrically conductive member 4*d* is disposed in the avoidance groove, to avoid interference that is with another structure in the housing 1 and that is caused when the electrically conductive member 4*d* entirely protrudes from the outer peripheral surface of the basin frame 4*a*24. Certainly, it can be understood that alternatively, the outer peripheral surface of the basin frame 4*a*24 is not provided with the avoidance groove.

Figure 17:
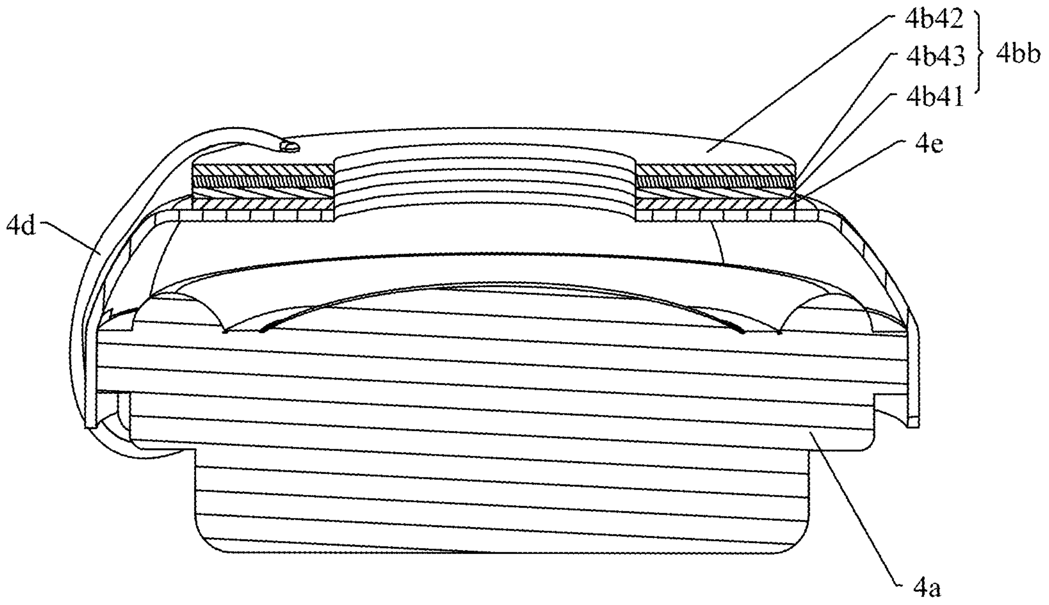
FIG. 17 is a schematic sectional view of the speaker module shown in FIG. 8.

In some embodiments of this application, refer to FIG. 17. FIG. 17 is a schematic sectional view of the speaker module 4 shown in FIG. 8. The negative electrode of the second speaker unit 4*b* is disposed at an end, close to the support plate 4*c*1, of the second speaker unit 4*b*; and the negative electrode of the second speaker unit 4*b* and the support plate 4*c*1 are connected to each other by using an electrically conductive adhesive 4*e*. These settings can facilitate electrically connecting the negative electrode of the second speaker unit 4*b* to the support plate 4*c*1, so that a structure, such as a signal line, used for electrical connection does not need to be additionally disposed therebetween. The positive electrode of the second speaker unit 4*b* is disposed at an end, away from the support plate 4*c*1, of the second speaker unit 4*b*; and the positive electrode of the second speaker unit 4*b* and the electrically conductive member 4*d* are connected to each other by using an electrically conductive adhesive or via welding. These settings can facilitate spacing the positive electrode and the negative electrode of the second speaker unit 4*b* apart, so that a short circuit problem can be avoided at least to some extent.

In some embodiments of this application, still refer to FIG. 17. The second speaker unit 4*b* is a piezoelectric ceramic speaker unit; and the piezoelectric ceramic speaker unit and the support plate 4*c*1 are disposed via laminating. A manner of connecting the piezoelectric ceramic speaker unit and the support plate 4*c*1 includes but is not limited to adhering or welding. In this embodiment of this application, the piezoelectric ceramic speaker unit is thin in thickness and small in size, and has a fairly good high-frequency sound effect.

Specifically, the piezoelectric ceramic speaker unit includes a piezoelectric ceramic sheet 4*bb*. The piezoelectric ceramic sheet 4*bb* includes a piezoelectric body 4*b*43, a first electrode layer 4*b*41, and a second electrode layer 4*b*42.

It can be understood that FIG. 17 and the following related accompanying drawings merely show examples of some components included in the second speaker unit 4*b*. Actual shapes, actual sizes, actual locations, and actual structures of these components are not limited by FIG. 17 and the following accompanying drawings.

The first electrode layer 4*b*41 constitutes the negative electrode of the piezoelectric ceramic speaker unit. The second electrode layer 4*b*42 constitutes the positive electrode of the piezoelectric ceramic speaker unit. The first electrode layer 4*b*41 and the second electrode layer 4*b*42 clamp the piezoelectric body 4*b*43. The piezoelectric body 4*b*43 may be made of a ceramic material. For example, a material of the piezoelectric body 4*b*43 includes but is not limited to solid solutions and the like of lead zirconate, lead zirconate titanate, lead lanthanum zirconate titanate, barium titanate, tungsten bronze compound, barium titanate, and bismuth ferrite. The first electrode layer 4*b*41 and the second electrode layer 4*b*42 may be formed on the piezoelectric body 4*b*43 via evaporation, electroplating, sputtering, or the like. Materials of the first electrode layer 4*b*41 and the second electrode layer 4*b*42 may be metal. Specifically, for example, the material of the first electrode layer 4*b*41 includes but is not limited to gold, platinum, silver, copper, palladium, chromium, molybdenum, iron, tin, aluminum, nickel, and the like; and the material of the second electrode layer 4*b*42 includes but is not limited to gold, platinum, silver, copper, palladium, chromium, molybdenum, iron, tin, aluminum, nickel, and the like. The material of the first electrode layer 4*b*41 may be the same as or different from the material of the second electrode layer 4*b*42. When alternating current is applied to the piezoelectric ceramic speaker unit, the piezoelectric body 4*b*43 is stretched and deformed, to push air to vibrate and produce sound. In this embodiment, the first electrode layer 4*b*41 of the piezoelectric ceramic speaker unit is disposed on a surface on a side, facing the support plate 4*c*1, of the piezoelectric body 4*b*43; and the first electrode layer 4*b*41 and the support plate 4*c*1 may be electrically connected to each other by using an electrically conductive adhesive 4*e*. The second electrode layer 4*b*42 is disposed on a surface on a side, away from the support plate 4*c*1, of the piezoelectric body 4*b*43; and the second electrode layer 4*b*42 may be welded to the electrically conductive member 4*d*.

Figure 18:
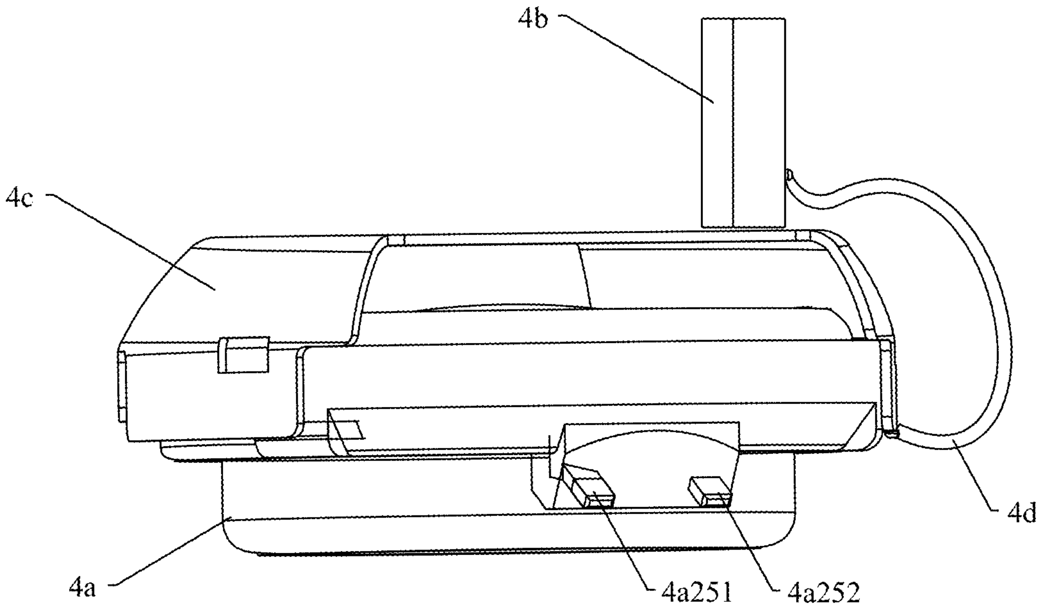
FIG. 18 is a schematic diagram of a structure of a speaker module according to still some other embodiments of this application.

In some other embodiments of this application, refer to FIG. 18. FIG. 18 is a schematic diagram of a structure of a speaker module 4 according to still some other embodiments of this application. The second speaker unit 4*b* is a moving-iron speaker unit. The second speaker unit 4*b* is vertically supported by a surface on the side, facing the sound output hole 110, of the support plate 4*c*1. The second speaker unit 4*b* is disposed between an inner peripheral surface of the first voice transmission channel 4*c*11 and an outer peripheral surface of the support plate 4*c*1.

Figure 19:
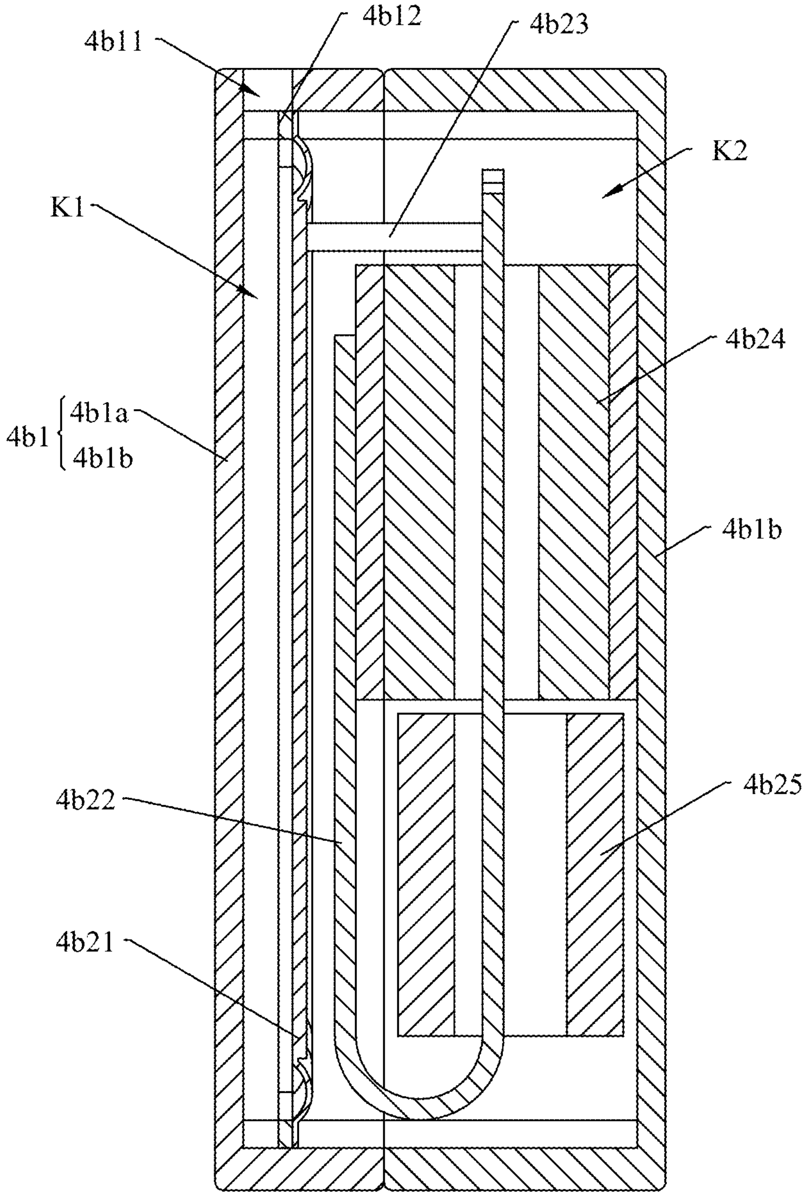
FIG. 19 is a schematic diagram of a sectional structure of a second speaker unit shown in FIG. 18.

Refer to FIG. 19. FIG. 19 is a schematic diagram of a sectional structure of the second speaker unit 4*b* shown in FIG. 18. In this embodiment, the second speaker unit 4*b* may include: a protecting shell 4*b*1, a second diaphragm assembly 4*b*21, a reed 4*b*22, a transmission rod 4*b*23, a second magnetic circuit system 4*b*24, and a second voice coil 4*b*25.

It can be understood that FIG. 19 and the following related accompanying drawings merely show examples of some components included in the second speaker unit 4*b*. Actual shapes, actual sizes, actual locations, and actual structures of these components are not limited by FIG. 19 and the following accompanying drawings.

The protecting shell 4*b*1 is used as a carrier of components in the second speaker unit 4*b* to protect the second diaphragm assembly 4*b*21, the reed 4*b*22, the transmission rod 4*b*23, the second magnetic circuit system 4*b*24, the second voice coil 4*b*25, and the like. A manner of connecting the protecting shell 4b1 and the support plate 4c1 includes but is not limited to clamping, adhering, welding, or screw connection.

A sound output channel 4b11 is formed in a side, close to the sound output hole 110, of the protecting shell 4b1. Sound of the second speaker unit 4b may be output through the sound output channel 4b11, so that both the second speaker unit 4b and the first speaker unit 4a are enabled to produce sound towards the sound output hole 110.

A material of the protecting shell 4b1 includes but is not limited to metal, plastic, and a combination of metal and plastic. In some embodiments, the material of the protecting shell 4b1 is plastic. The plastic has low costs and is easy to form. This helps reduce processing costs of the second speaker unit 4b. In some other examples, the material of the protecting shell 4b1 may be metal, to improve structural strength of the protecting shell 4b1.

The protecting shell 4b1 extends in a sound output direction of the sound output hole 110, that is, a length direction of the protecting shell 4b1 is the same as the sound output direction of the sound output hole 110. Specifically, refer to FIG. 19. The protecting shell 4b1 may take the shape of a cuboid.

The protecting shell 4b1 may be of an integral structure, or may be formed by assembling a plurality of parts. In some embodiments, still refer to FIG. 19. The protecting shell 4b1 includes a first shell portion 4b1a and a second shell portion 4b1b. The first shell portion 4b1a and the second shell portion 4b1b are arranged in a radial direction of the first speaker unit 4a and are connected via splicing. This can facilitate separate processing of the first shell portion 4b1a and the second shell portion 4b1b, which helps simplify mold structures of the first shell portion 4b1a and the second shell portion 4b1b, thereby reducing difficulty of molding the first shell portion 4b1a and the second shell portion 4b1b, and further reducing difficulty in processing and manufacturing the protecting shell 4b1.

Still refer to FIG. 19. The second diaphragm assembly 4b21 is disposed in the protecting shell 4b1. The second diaphragm assembly 4b21 is parallel to the axial direction of the first speaker unit 4a. In this way, the second diaphragm assembly 4b21 may be disposed perpendicular to the first diaphragm assembly 4a21. Therefore, sound output by the first speaker unit 4a can be prevented at least to some extent from interfering vibration of the second diaphragm assembly 4b21.

The second speaker unit 4b divides space in the protecting shell 4b1 into a front cavity k1 and a rear cavity k2 by using the second diaphragm assembly 4b21. In this way, the front cavity k1 and the rear cavity k2 are arranged in the radial direction of the first speaker unit 4a.

Figure 20:
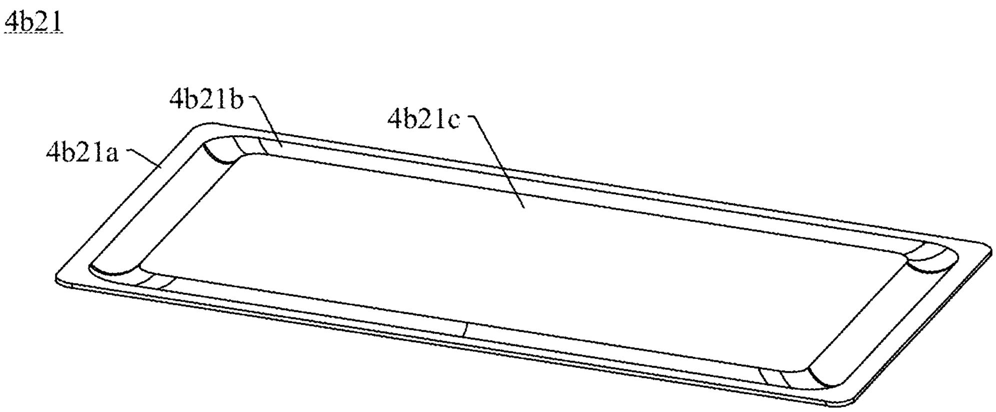
FIG. 20 is a schematic diagram of a structure of a second diaphragm assembly of a second speaker unit shown in FIG. 19.

Refer to FIG. 20. FIG. 20 is a schematic diagram of a structure of the second diaphragm assembly 4b21 of the second speaker unit 4b shown in FIG. 19. The second diaphragm assembly 4b21 includes a second connecting portion 4b21a, a second corrugated rim 4b21b, and a second dome 4b21c.

The second connecting portion 4b21a takes the shape of a circular sheet. The second connecting portion 4b21a is a rectangular ring with rounded corners.

Refer to FIG. 20 with reference to FIG. 19. An inner peripheral surface of the protecting shell 4b1 is provided with a step portion 4b12. The second connecting portion 4b21a is disposed on the step portion 4b12 via laminating. A manner of connecting the second connecting portion 4b21a and the step portion 4b12 includes but is not limited to adhering. Certainly, in some other examples, alternatively, the protecting shell 4b1 is not provided with the step portion 4b12; the second connecting portion 4b21a takes the shape of a circular cylinder; and the second connecting portion 4b21a is connected to the inner peripheral surface of the protecting shell 4b1.

The second corrugated rim 4b21b is disposed at an outer periphery of the second dome 4b21c and is surrounded by the second connecting portion 4b21a. The second corrugated rim 4b21b takes the shape of a rectangular ring with rounded corners. The second corrugated rim 4b21b is recessed towards a side close to the rear cavity K2, to form an arc-shaped or approximately arc-shaped section. The setting can save space of the front cavity K1. Certainly, this application is not limited thereto. In another embodiment, the second corrugated rim 4b21b is recessed towards a side close to the front cavity K1, to form an arc-shaped or approximately arc-shaped section.

In some examples, the second diaphragm assembly 4b21 may be an integrally formed member, that is, the second connecting portion 4b21a, the second corrugated rim 4b21b, and the second dome 4b21c are integrally formed and are connected into a whole. The setting not only helps simplify a processing technique and reduce production costs, but also can improve strength of connection between the second connecting portion 4b21a and the second corrugated rim 4b21b and connection between the second corrugated rim 4b21b and the second dome 4b21c. Certainly, this application is not limited thereto. In another embodiment, alternatively, the second connecting portion 4b21a, the second corrugated rim 4b21b, and the second dome 4b21c are separately processed and manufactured, and then connected via adhering or the like.

Still refer to FIG. 19. The reed 4b22 is disposed in the rear cavity K2 of the second speaker unit 4b, and is configured to provide driving force for vibration of the second diaphragm assembly 4b21. A material of the reed 4b22 includes but is not limited to metal.

Figure 21:
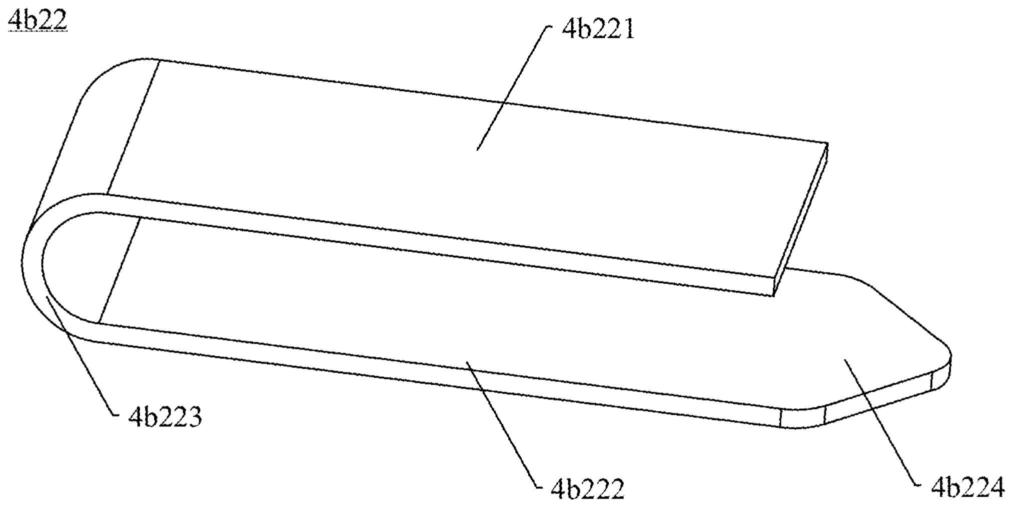
FIG. 21 is a schematic diagram of a structure of a reed of the second speaker unit shown in FIG. 19.

Refer to FIG. 21. FIG. 21 is a schematic diagram of a structure of the reed 4b22 of the second speaker unit 4b shown in FIG. 19. The reed 4b22 includes a first reed body 4b221, a second reed body 4b222, and a connecting reed body 4b223.

The first reed body 4b221 takes the shape of a rectangular sheet. The first reed body 4b221 is disposed parallel to the second diaphragm assembly 4b21. The second reed body 4b222 takes the shape of a rectangular sheet. The second reed body 4b222 is disposed parallel to the second diaphragm assembly 4b21. The second reed body 4b222 is disposed on a side, away from the second diaphragm assembly 4b21, of the first reed body 4b221. The second reed body 4b222 may have the same size as the first reed body 4b221.

An end of the second reed body 4b222 is provided with a support body 4b224 that exceeds an edge of the first reed body 4b221. The support body 4b224 takes the shape of a triangle. In some examples, the support body 4b224 and the second reed body 4b222 may be an integrally formed member, that is, the support body 4b224 and the second reed body 4b222 are connected into an integral structure. In some other examples, the support body 4b224 and the second reed body 4b222 may be connected to each other via adhering, clamping, welding, threaded connection, or the like.

A shape of the connecting reed body 4b223 includes but is not limited to "C" or "V". The connecting reed body 4b223 is connected between an end, away from the support body 4b224, of the second reed body 4b222 and an end, away from the support body 4b224, of the first reed body 4b221.

The reed 4b22 may be an integrally formed member, that is, the first reed body 4b221, the second reed body 4b222, and the connecting reed body 4b223 are connected into a whole. The setting not only helps simplify a processing technique and reduce production costs, but also can improve strength of connection between the first reed body 4b221 and the connecting reed body 4b223 and connection between the second reed body 4b222 and the connecting reed body 4b223. Certainly, this application is not limited thereto. In another embodiment, alternatively, the first reed body 4b221, the second reed body 4b222, and the connecting reed body 4b223 are separately processed and manufactured, and then connected via adhering, welding, or the like.

Still refer to FIG. 19. The transmission rod 4b23 takes the shape of a rod. The transmission rod 4b23 is connected between the support body 4b224 and the second dome 4b21c. The transmission rod 4b23 is disposed perpendicular to the second reed body 4b222. Due to connection of the transmission rod 4b23, vibration of the reed 4b22 can be transmitted to the second diaphragm assembly 4b21, thereby making the second speaker unit 4b to produce sound.

A material of the transmission rod 4b23 includes but is not limited to metal or hard plastic. A manner of connecting the transmission rod 4b23 and the second reed body 4b222 includes but is not limited to adhering, welding, clamping, or threaded connection. A manner of connecting the transmission rod 4b23 and the second diaphragm assembly 4b21 includes but is not limited to adhering, welding, clamping, or threaded connection.

Figure 22:
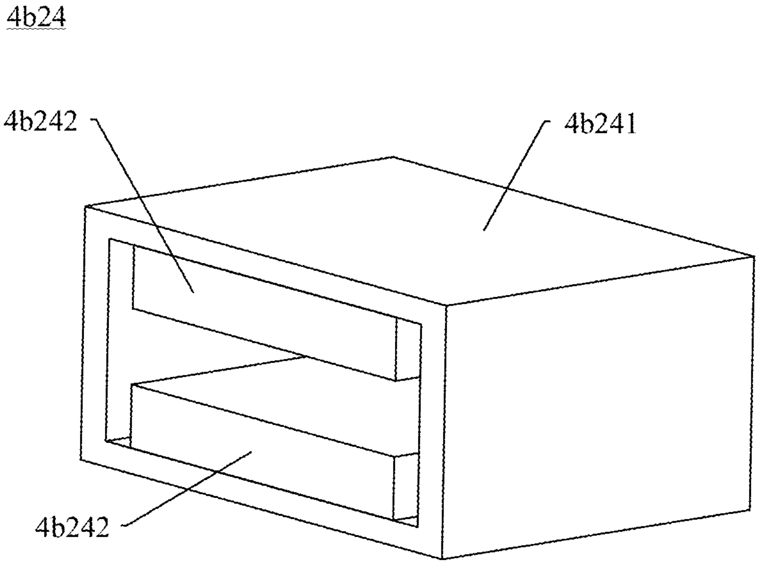
FIG. 22 is a schematic diagram of a structure of a second magnetic circuit system of the second speaker unit shown in FIG. 19.

Refer to FIG. 22 with reference to FIG. 19. FIG. 22 is a schematic diagram of a structure of the second magnetic circuit system 4b24 of the second speaker unit 4b shown in FIG. 19. The second magnetic circuit system 4b24 is disposed in the rear cavity K2 of the second speaker unit 4b. The second magnetic circuit system 4b24 includes a magnetically conductive portion 4b241 and two magnet portions 4b242.

The magnetically conductive portion 4b241 takes the shape of a rectangular ring. An axial direction of the magnetically conductive portion 4b241 is the same as the axial direction of the basin frame 4a24. The first reed body 4b221 is supported by a surface on a side, close to the second diaphragm assembly 4b21, of the magnetically conductive portion 4b241. A manner of connecting the first reed body 4b221 and the magnetically conductive portion 4b241 includes but is not limited to adhering or clamping.

The two magnet portions 4b242 are disposed in the magnetically conductive portion 4b241 and are opposite in a radial direction of the magnetically conductive portion 4b241.

A shape of the magnet portion 4b242 includes but is not limited to a cuboid, a cylinder, or an irregular shape. Magnetizing directions of the two magnet portions 4b2422 are opposite. For example, for one of the magnet portions 4b242, an end close to a central axis of the magnetically conductive portion 4b241 is an N pole, and an end away from the central axis of the magnetically conductive portion 4b241 is an S pole; and for the other magnet portion 4b242, an end close to the central axis of the magnetically conductive portion 4b241 is an S pole, and an end away from the central axis of the magnetically conductive portion 4b241 is an N pole.

Still refer to FIG. 19. The second reed body 4b222 penetrates from one end in the axial direction of the magnetically conductive portion 4b241 to the other end in the axial direction of the magnetically conductive portion 4b241, so that the support body 4b224 is disposed on an outer side of the magnetically conductive portion 4b241, and the second reed body 4b222 is disposed between the two magnet portions 4b242.

The second voice coil 4b25 is disposed on a side, close to the connecting reed body 4b223, in the axial direction of the magnetically conductive portion 4b241. The second voice coil 4b25 surrounds an outer periphery of the second reed body 4b222.

In some examples, a side wall, close to the support plate 4c1, of the protecting shell 4b1 may be constructed as an electrically conductive structure. A negative lead of the second voice coil 4b25 is electrically connected to the electrically conductive structure via welding or the like. The electrically conductive structure may constitute the negative electrode of the second speaker unit 4b. The electrically conductive structure may be connected to the support plate 4c1 via welding or by using an electrically conductive adhesive. Based on these settings, the negative electrode of the second speaker unit 4b can be electrically connected to the negative wiring terminal 4a251. Certainly, this application is not limited thereto. In some other examples, a peripheral wall of the protecting shell 4b1 may be further provided with a through hole; and the negative lead of the second voice coil 4b25 can penetrate the through hole to be electrically connected to the bracket 4c.

In some examples, a wire passing hole is formed in the peripheral wall of the protecting shell 4b1 or in a side wall on a side, away from the support plate 4c1, of the protecting shell 4b1. The electrically conductive member 4d may penetrate the wire passing hole to be electrically connected to a positive lead of the second voice coil 4b25; or the positive lead of the second voice coil 4b25 penetrates the wire passing hole to be electrically connected to the electrically conductive member 4d.

When the second voice coil 4b25 is powered on, the second voice coil 4b25 can generate a magnetic field, so that the second reed body 4b222 in the second voice coil 4b25 is magnetized to generate a magnetic pole. In this way, driving force that drives the second reed body 4b222 to vibrate in a spacing direction of the two magnet portions 4b242 may be formed between the second voice coil 4b25 and the magnet portions 4b242. Vibration of the second reed body 4b222 can drive the transmission rod 4b23 to vibrate. Then, vibration of the transmission rod 4b23 drives the second diaphragm assembly 4b21 to vibrate. Vibration of the second diaphragm assembly 4b21 can push air in the front cavity K1 to vibrate and generate sound. The sound is output through the sound output channel 4b11.

Figure 23:
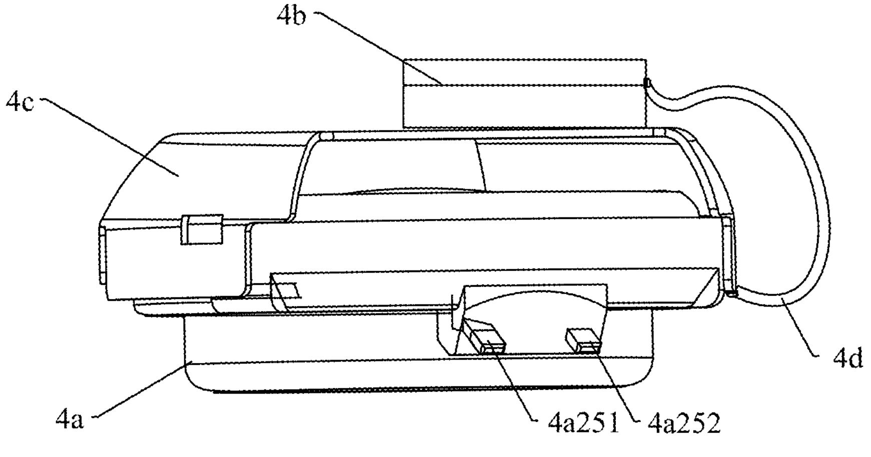
FIG. 23 is a schematic diagram of a speaker module according to some other embodiments of this application.

Refer to FIG. 23. FIG. 23 is a schematic diagram of a structure of a speaker module 4 according to yet some other embodiments of this application. In this embodiment, alternatively, the second speaker unit 4b is transversally supported by the surface on the side, facing the sound output hole 110, of the support plate 4c1, that is, a length direction of the second speaker unit 4b is parallel to the support plate 4c1.

In the description of this specification, specific features, structures, materials, or characteristics may be combined in an appropriate manner in any one or more embodiments or examples.

Finally, it should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A speaker module, comprising:

a first speaker unit, wherein the first speaker unit comprises a basin frame and a wiring terminal, and the wiring terminal is disposed on the basin frame;

a bracket; and a second speaker unit, wherein the second speaker unit is connected to the bracket, and the bracket is connected to the basin frame;

wherein the wiring terminal comprises a first wiring terminal and a second wiring terminal, the first wiring terminal and the second wiring terminal are different, and wherein a second electrode of the second speaker unit is electrically connected to the second wiring terminal by using an electrically conductive member, and a first electrode of the second speaker unit is electrically connected to the first wiring terminal, the first electrode and the second electrode have different polarities, and wherein the second wiring terminal is provided with an electrically conductive wiring portion, the electrically conductive wiring portion is disposed on an inner side of a peripheral wall of the basin frame, the peripheral wall of the basin frame is provided with a second opening, and the electrically conductive member extends into the basin frame through the second opening and is electrically connected to the electrically conductive wiring portion.

2. The speaker module according to claim 1, wherein the wiring terminal is disposed on an outer surface of the peripheral wall of the basin frame.

3. The speaker module according to claim 1, wherein the bracket comprises a connecting portion, the second speaker unit is connected to the peripheral wall of the basin frame through the connecting portion, a part of the electrically conductive member is disposed on a side to which an outer surface of the connecting portion faces or an outer surface of the basin frame, a cabling channel is formed in the outer surface of the connecting portion or the outer surface of the basin frame, and a part of the electrically conductive member is disposed in the cabling channel.

4. The speaker module according to claim 1, wherein the first speaker unit comprises a first diaphragm assembly, and the first diaphragm assembly is supported by the basin frame; and the bracket comprises a connecting portion and a support plate, the support plate is disposed on an axial side of the first speaker unit and is opposite an outer surface of the first diaphragm assembly, the connecting portion is connected between an outer peripheral edge of the support plate and a peripheral wall of the basin frame, and the second speaker unit is supported by a side, away from the first speaker unit, of the support plate.

5. The speaker module according to claim 4, wherein an electrically conductive portion of the bracket consists of: only a part of the connecting portion, only the entire connecting portion, the connecting portion and a part of the support plate, a part of the bracket, or the bracket.

6. The speaker module according to claim 4, wherein the support plate is provided with a third opening, and the second speaker unit does not cover the third opening, wherein a sound generated by the first speaker unit is transmitted through the third opening.

7. The speaker module according to claim 4, wherein the peripheral wall of the basin frame is provided with a first opening, the first wiring terminal is provided with an electrically conductive extending portion, the electrically conductive extending portion is disposed in the basin frame, the electrically conductive extending portion extends into the first opening, and a part of an electrically conductive portion is connected to the electrically conductive extending portion.

8. The speaker module according to claim 4, wherein the second speaker unit is a piezoelectric ceramic speaker unit, and a sound production frequency of the second speaker unit is greater than a sound production frequency of the first speaker unit.

9. An earphone comprising:

a housing, wherein a sound output hole is formed in the housing;

a circuit board, wherein the circuit board is disposed in the housing; and a speaker module comprising:

a first speaker unit, wherein the first speaker unit comprises a basin frame and a wiring terminal, and the wiring terminal is disposed on the basin frame;

a bracket; and a second speaker unit, wherein the second speaker unit is connected to the bracket, and the bracket is connected to the basin frame;

wherein the wiring terminal comprises a first wiring terminal and a second wiring terminal, the first wiring terminal and the second wiring terminal are different, and wherein a second electrode of the second speaker unit is electrically connected to the second wiring terminal by using an electrically conductive member, and a first electrode of the second speaker unit is electrically connected to the first wiring terminal, the first electrode and the second electrode have different polarities, and wherein the second wiring terminal is provided with an electrically conductive wiring portion, the electrically conductive wiring portion is disposed on an inner side of a peripheral wall of the basin frame, the peripheral wall of the basin frame is provided with a second opening, and the electrically conductive member extends into the basin frame through the second opening and is electrically connected to the electrically conductive wiring portion, and wherein the speaker module is disposed in the housing, both the first speaker unit and the second speaker unit produce sound towards the sound output hole, and the speaker module is electrically connected to the circuit board by using the wiring terminal.

10. The earphone according to claim 9, wherein the wiring terminal is disposed on an outer surface of the peripheral wall of the basin frame.

11. The earphone according to claim 9, wherein the bracket comprises a connecting portion, the second speaker unit is connected to the peripheral wall of the basin frame through the connecting portion, a part of the electrically conductive member is disposed on a side to which an outer surface of the connecting portion faces or an outer surface of the basin frame, a cabling channel is formed in the outer surface of the connecting portion or the outer surface of the basin frame, and a part of the electrically conductive member is disposed in the cabling channel.

12. The earphone according to claim 9, wherein the first speaker unit comprises a first diaphragm assembly, and the first diaphragm assembly is supported by the basin frame; and the bracket comprises a connecting portion and a support plate, the support plate is disposed on an axial side of the first speaker unit and is opposite an outer surface of the first diaphragm assembly, the connecting portion is connected between an outer peripheral edge of the support plate and a peripheral wall of the basin frame, and the second speaker unit is supported by a side, away from the first speaker unit, of the support plate.

13. The earphone according to claim 12, wherein an electrically conductive portion of the bracket consists of: only a part of the connecting portion, only the entire connecting portion, the connecting portion and a part of the support plate, a part of the bracket, or the bracket.

14. The earphone according to claim 12, wherein the support plate is provided with a third opening, and the second speaker unit does not cover the third opening, wherein a sound generated by the first speaker unit is transmitted through the third opening.

15. The earphone according to claim 14, wherein the peripheral wall of the basin frame is provided with a first opening, the first wiring terminal is provided with an electrically conductive extending portion, the electrically conductive extending portion is disposed in the basin frame, the electrically conductive extending portion extends into the first opening, and a part of an electrically conductive portion is connected to the electrically conductive extending portion.

16. The earphone according to claim 14, wherein the second speaker unit is a piezoelectric ceramic speaker unit, and a sound production frequency of the second speaker unit is greater than a sound production frequency of the first speaker unit.

* * * * *